(12) United States Patent
Tracey

(10) Patent No.: US 8,317,121 B2
(45) Date of Patent: Nov. 27, 2012

(54) REEL APPARATUS WITH DECORATIVE HOUSING

(75) Inventor: James B. A. Tracey, Austin, TX (US)

(73) Assignee: Great Stuff, Inc., Austin, TX (US)

( * ) Notice: Subject to any disclaimer, the term of this patent is extended or adjusted under 35 U.S.C. 154(b) by 563 days.

(21) Appl. No.: 12/199,156

(22) Filed: Aug. 27, 2008

(65) Prior Publication Data

US 2009/0057472 A1    Mar. 5, 2009

Related U.S. Application Data

(60) Provisional application No. 60/968,796, filed on Aug. 29, 2007.

(51) Int. Cl.
*B65H 75/44* (2006.01)

(52) U.S. Cl. .... 242/398; 242/403; D8/358; 137/355.26; 137/355.27

(58) Field of Classification Search .................. 242/403, 242/397, 398, 598.5, 598.6
See application file for complete search history.

(56) References Cited

U.S. PATENT DOCUMENTS

| | | | |
|---|---|---|---|
| 439,396 A | 10/1890 | French | |
| 1,893,972 A | 1/1933 | Whitman | |
| 2,286,904 A | 6/1942 | Ewald | |
| 2,403,277 A | 7/1946 | Hall | |
| 2,540,434 A | 2/1951 | Fengler | |
| 2,958,156 A * | 11/1960 | Schmahl et al. | 242/380 |
| 3,101,846 A | 8/1963 | Eifrid | |
| 3,493,105 A | 2/1970 | Greb et al. | |
| 4,223,710 A | 9/1980 | Brothers | |
| 4,330,005 A | 5/1982 | Kjarsgaard | |
| 4,330,131 A * | 5/1982 | Warehime | 473/575 |
| 4,601,474 A * | 7/1986 | Lew et al. | 473/576 |
| 4,969,610 A | 11/1990 | Taylor et al. | |
| 5,011,034 A | 4/1991 | Abel | |
| D328,183 S | 7/1992 | Harris | |
| D340,576 S | 10/1993 | Delagarza et al. | |
| 5,390,695 A | 2/1995 | Howard | |
| D357,500 S * | 4/1995 | Mutterperl | D19/36 |
| 5,518,417 A | 5/1996 | Liu | |
| 5,566,898 A | 10/1996 | Cline | |
| 5,634,615 A | 6/1997 | Shuen | |

(Continued)

FOREIGN PATENT DOCUMENTS

JP    2004 315103    11/2004

(Continued)

OTHER PUBLICATIONS

International Search Report and Written Opinion for PCT Application No. PCT/US2008/074661, dated Feb. 5, 2009.

(Continued)

*Primary Examiner* — William A Rivera
(74) *Attorney, Agent, or Firm* — Knobbe Martens Olson & Bear, LLP

(57) ABSTRACT

A reel includes a substantially spherical housing configured to enclose a rotatable reel drum and an aperture sized to closely surround a linear material extending through the aperture. The linear material is spoolable and unspoolable from the reel drum while the housing encloses the reel drum. The housing includes decoration depicting a ball indicative of a game or type of recreation, a globe, a robot, a gazing ball, at least one flag, camouflage, foliage, diamond plate, or a race car.

21 Claims, 30 Drawing Sheets

U.S. PATENT DOCUMENTS

| | | | |
|---|---|---|---|
| D382,327 S | 8/1997 | Young et al. | |
| 5,988,207 A | 11/1999 | Kownacki et al. | |
| D419,961 S | 2/2000 | Weatherill | |
| 6,026,969 A * | 2/2000 | Okui | 211/14 |
| 6,171,200 B1 * | 1/2001 | Camp | 473/249 |
| 6,199,804 B1 * | 3/2001 | Donofrio, Jr. | 248/121 |
| 6,279,848 B1 | 8/2001 | Mead, Jr. | |
| 6,412,656 B1 | 7/2002 | Placik | |
| 6,672,329 B1 | 1/2004 | Brooks et al. | |
| 6,845,737 B1 | 1/2005 | Austin | |
| 6,921,040 B2 * | 7/2005 | Watari | 242/388.7 |
| 7,021,583 B2 | 4/2006 | Weatherill et al. | |
| 7,527,213 B2 | 5/2009 | Weatherill et al. | |
| 2002/0104916 A1 | 8/2002 | Weatherill | |
| 2006/0237574 A1 | 10/2006 | Weatherill et al. | |
| 2006/0266605 A1 | 11/2006 | Caamano et al. | |
| 2007/0194163 A1 | 8/2007 | Okonsky et al. | |

FOREIGN PATENT DOCUMENTS

| | | |
|---|---|---|
| WO | WO 2005/035417 | 4/2005 |

OTHER PUBLICATIONS

Invitation to Pay Additional Fees for PCT Application No. PCT/US2008/074661, dated Nov. 19, 2008.

Written Opinion dated Nov. 2, 2009, received in International Application No. PCT/US2008/074661.

* cited by examiner

REEL APPARATUS WITH DECORATIVE HOUSING

CROSS-REFERENCE TO RELATED APPLICATIONS

This application claims priority benefit under 35 U.S.C. §119(e) to U.S. Provisional Patent Application No. 60/968,796, filed Aug. 29, 2007, entitled REEL APPARATUS WITH DECORATIVE HOUSING, which is incorporated herein by reference in its entirety.

BACKGROUND

1. Field

The present invention relates generally to reels for spooling linear material, and more particularly to decorative reel housings for garden hoses or electrical cables.

2. Description of the Related Art

In the past, reels have been used for spooling linear material, such as hoses or wires. Many of such reels comprise a rotating reel drum enclosed within a housing during operation. A variety of different types of housings have been used. For example, reel housings have had many different shapes, such as cylindrical, rectangular, octagonal, etc. Generally, there has been very little effort expended in improving the aesthetic appearance of reel housings, especially those of garden hose and cable reels.

SUMMARY

In certain embodiments, a reel comprises a substantially spherical housing configured to enclose a rotatable reel drum and an aperture sized to closely surround a linear material extending through the aperture. The linear material is spoolable and unspoolable from the reel drum while the housing encloses the reel drum. In some embodiments, the housing comprises decoration depicting a ball indicative of a game or type of recreation. In some embodiments, the housing comprises decoration depicting a globe. In some embodiments, the housing comprises decoration depicting a robot. In some embodiments, the housing comprises decoration depicting a gazing ball. In some embodiments, the housing comprises decoration depicting at least one flag. In some embodiments, the housing comprises decoration depicting camouflage. In some embodiments, the housing comprises decoration depicting foliage. In some embodiments, the housing comprises decoration depicting diamond plate. In some embodiments, the housing comprises decoration depicting a race car.

In certain embodiments, a method of manufacturing a substantially spherical reel housing configured to enclose a rotatable reel drum comprises providing a film having a first side and a second side, applying a decoration to the second side of the film, placing the film in a mold, after placing the film in the mold, forming the reel housing in the mold, and removing the reel housing and the film from the mold. The first side of the mold is thereby exposed on an outer surface of the reel housing.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

Figure 1A:
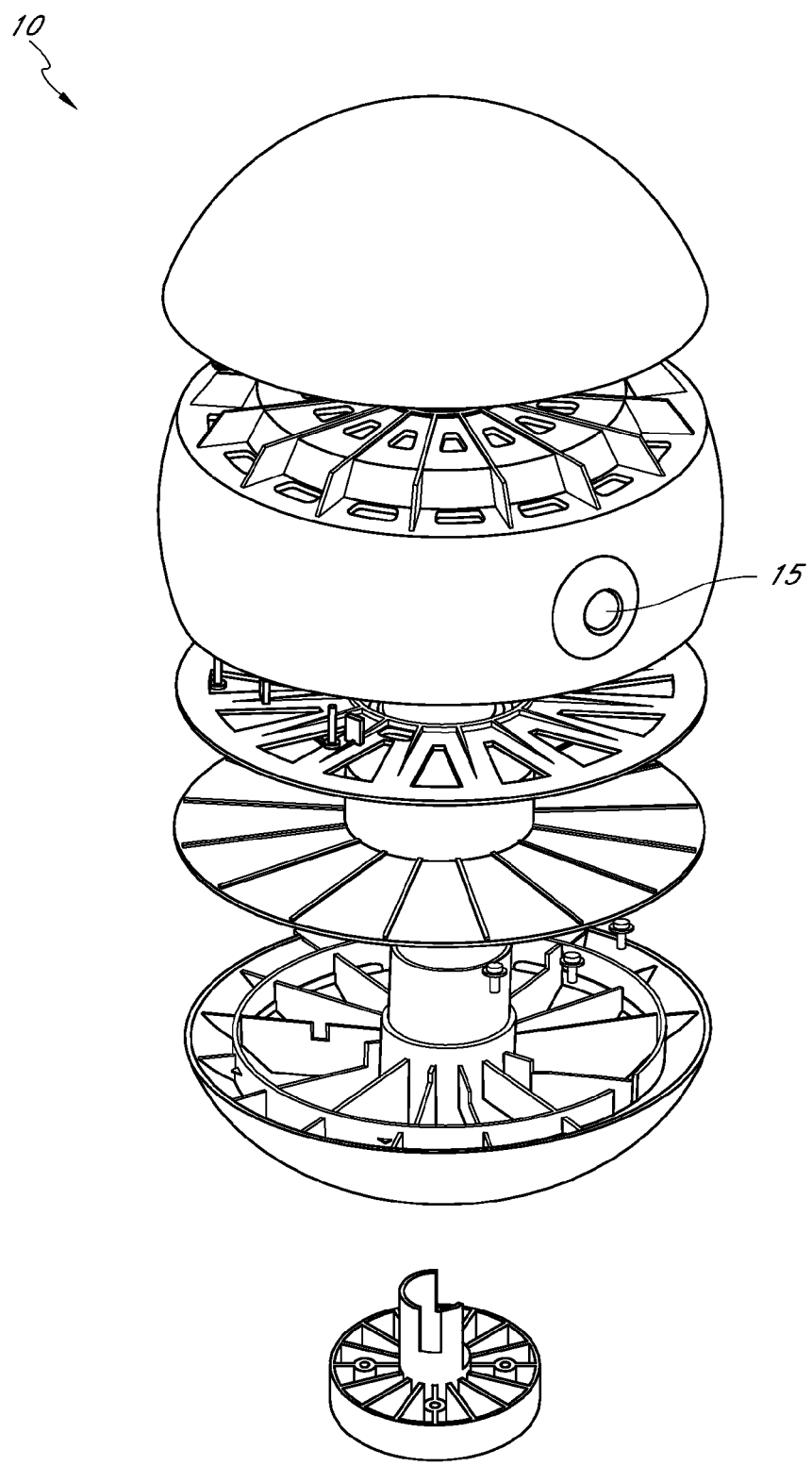
FIG. 1A is an exploded top perspective view of an example embodiment of a reel having a substantially spherical housing.
Figure 1B:
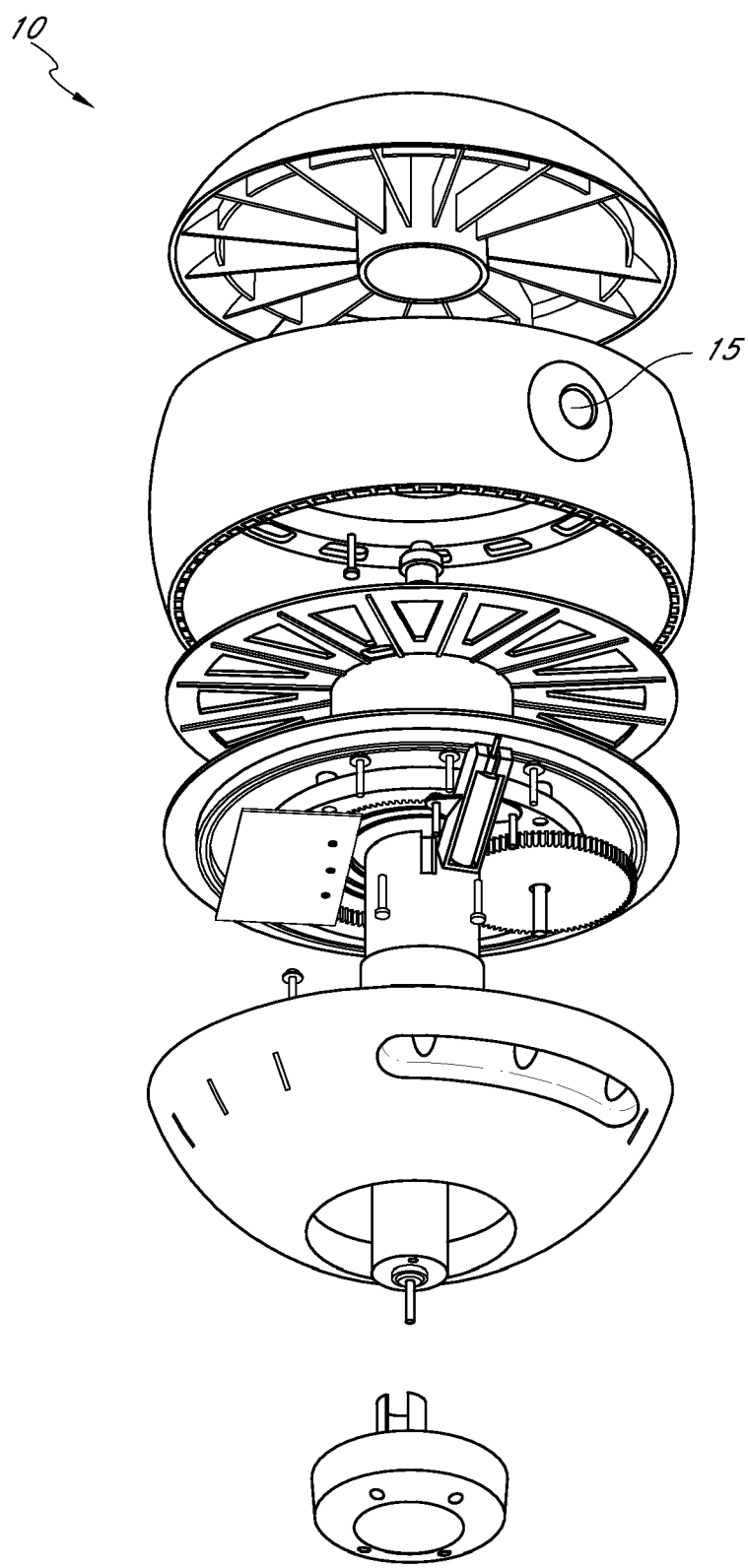
FIG. 1B is an exploded bottom perspective view of the reel of FIG. 1A.
Figure 1C:
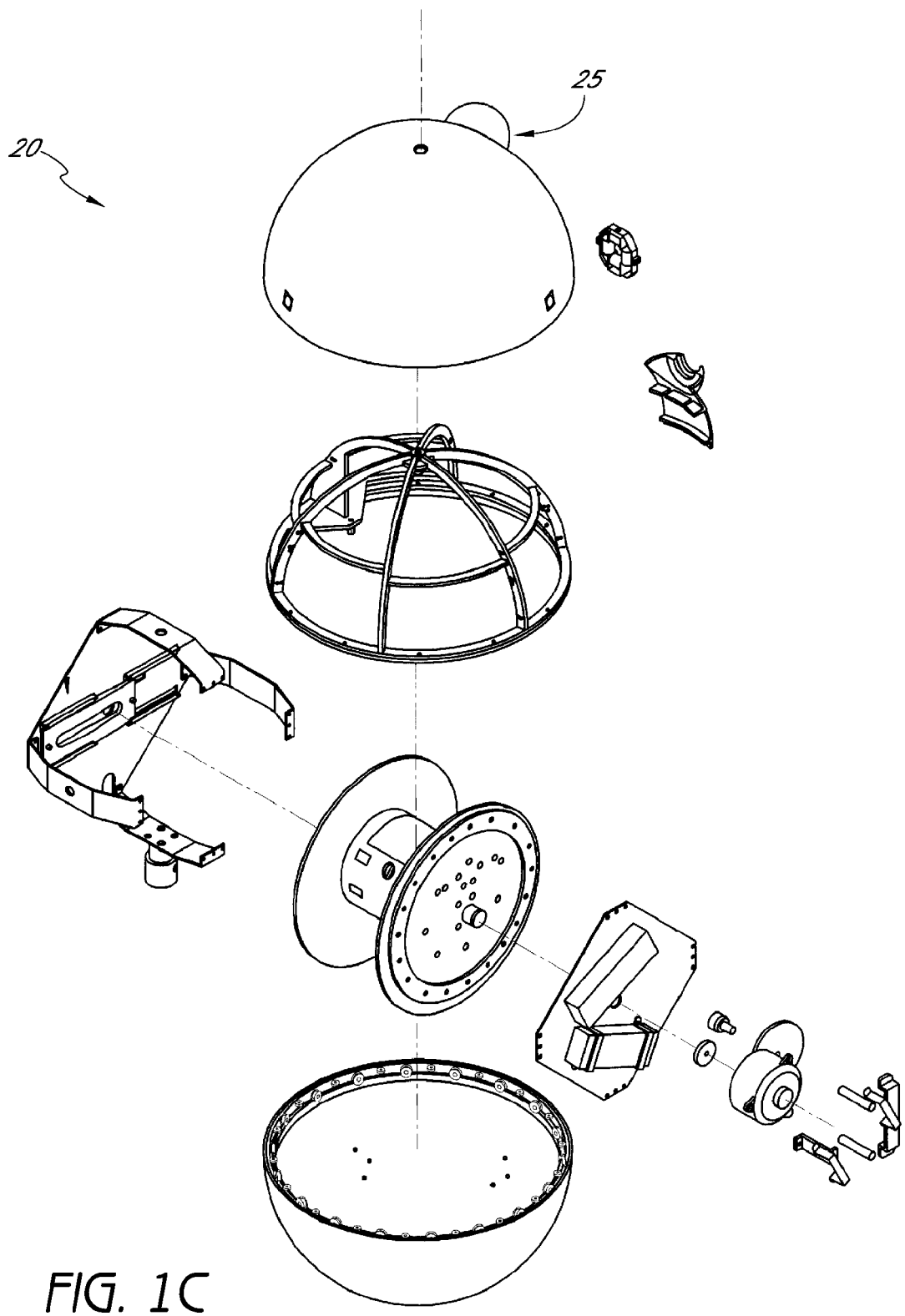
FIG. 1C is an exploded top perspective view of another example embodiment of a reel having a substantially spherical housing.

In certain embodiments, a reel comprises a rotatable element (e.g., reel drum) enclosed by a substantially spherical housing. FIGS. 1A and 1B are exploded top and bottom perspective views, respectively, of an example embodiment of a reel 10 having a substantially spherical housing. The components of such a reel are disclosed in co-pending and commonly owned U.S. patent application Ser. No. 11/187,187, filed Jul. 21, 2005, U.S. Patent Publication No. 2006/0266605, entitled "Reel and Reel Housing," incorporated herein by reference in its entirety. FIG. 1C is an exploded top perspective view of another example embodiment of a reel 20 having a substantially spherical housing. The components of such a reel are disclosed in commonly owned U.S. Pat. No. 6,279,848, entitled "Reel Having an Improved Reciprocating Mechanism," incorporated herein by reference in its entirety. Other reels for elongate members that comprise a substantially spherical housing are also possible.

The reel housing comprises an aperture sized to surround (e.g., to closely surround) a linear material extending through the aperture. In FIG. 1A, the reel 10 comprises an aperture 15. In FIG. 1C, the reel 20 comprises an aperture 25. The linear material is spoolable and unspoolable from a rotatable element (e.g., a reel drum) while the housing encloses the rotatable element. The linear material for the reel 10 preferably comprises an electrical cord (e.g., an extension cord, a specialized cord for the reel 10, etc.). The linear material for the reel 20 preferably comprises a hose (e.g., a garden hose, a specialized hose for the reel 20, etc.). It will be appreciated that the aperture in the reel housing may be configured to surround (e.g., to closely surround) any linear material within the reel housing.

The reel housing may be decorated to create an enhanced aesthetic appearance. In recognition that tastes can vary, as used herein, the phrase "enhanced aesthetic appearance" is to be given its broadest possible meaning including, but not limited to, having an appearance that at least one person believes is more aesthetically pleasing than a reel housing without such decoration. In certain embodiments, the housing comprises decoration depicting a ball having markings indicative of a game. In certain embodiments, the housing comprises decoration depicting a globe. In certain embodiments, the housing comprises decoration depicting a robot. In certain embodiments, the housing comprises decoration depicting a gazing ball. In certain embodiments, the housing comprises decoration depicting at least one flag. In certain embodiments, the housing comprises decoration depicting camouflage. In certain embodiments, the housing comprises decoration depicting foliage.

Figure 2:
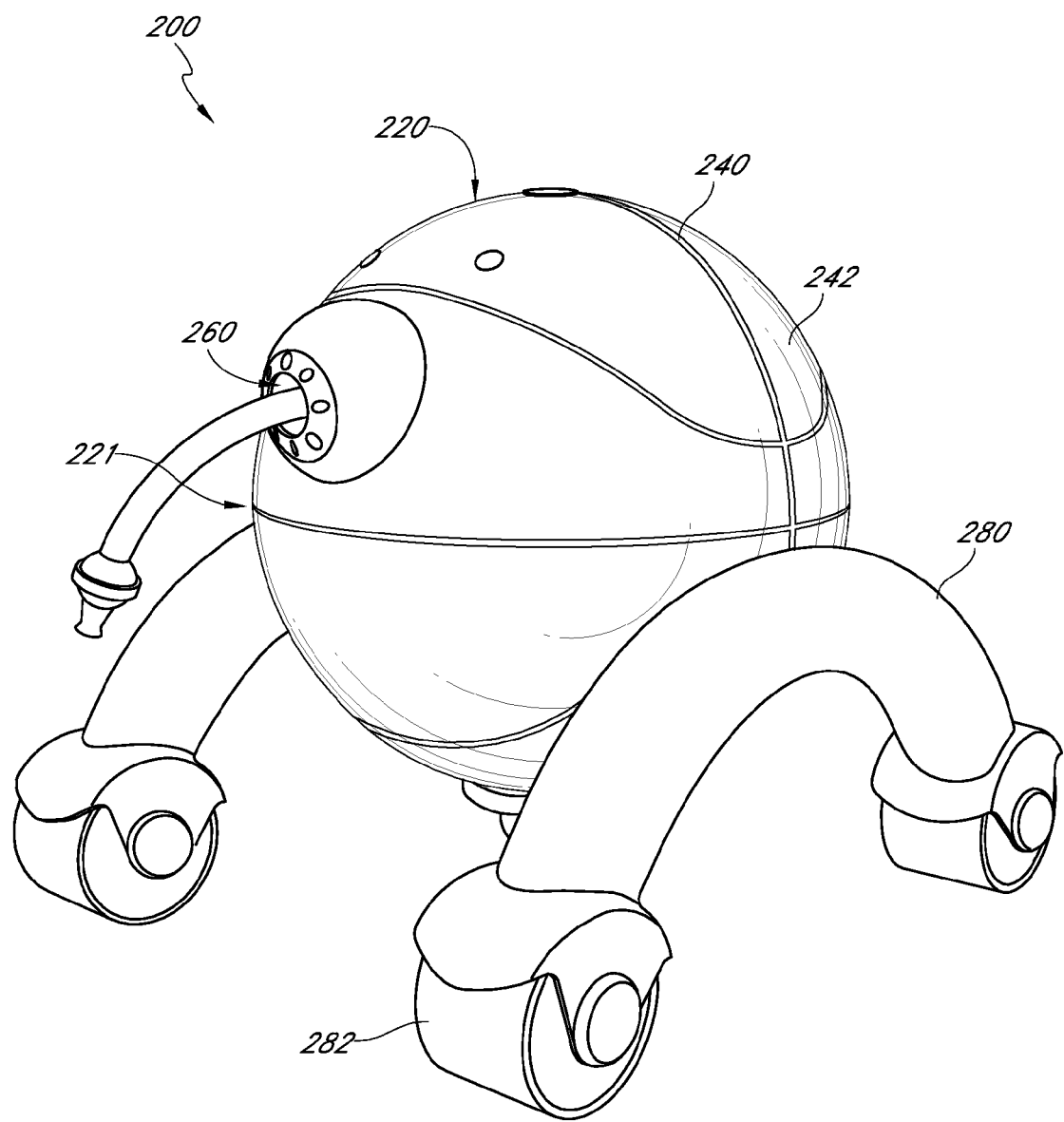
FIG. 2 is a right, front, and top perspective view of an example embodiment of a reel housing configured to have the appearance of a basketball.

FIG. 2 illustrates a housing 220 comprising decoration depicting a ball having markings 240, 242 indicative of the game basketball. The housing 220 includes an opening or aperture 260 through which an elongate member 262 (e.g., comprising a hose, comprising an electrical cable) can extend. Although illustrated in an upper hemisphere of the housing 220, the aperture 260 may be located in any suitable position on the housing 220, for example a central portion or in a lower hemisphere.

In a housing 220 indicative of the game basketball, the markings may comprise a plurality of seams 240 separating a plurality of panels 242. The markings 240, 242 may cover the entire housing 220, a portion of the housing 220, or a substantial portion of the housing 220. In certain embodiments, the housing 220, including the markings 240, 242, is substantially smooth. In certain such embodiments, the markings 240, 242 are shaded to simulate the appearance of topography. In some embodiments, the seams 240 are topographically depressed with respect to the panels 242. In certain embodiments, the housing 220 is adapted to have a surface texture consistent with a basketball (e.g., a plurality of convex dimples extending from each panel). In certain embodiments, the panels 242 include a rubbery or leather-type material to simulate the feel and/or appearance of a basketball.

In some embodiments, the housing 220 further comprises text, logos, or the like to depict a certain type of basketball (e.g., National Basketball Association™, National Collegiate Athletic Association™, etc.) or reel manufacturer (e.g., Great Stuff, Inc.™). The housing 220 preferably comprises a traditional orange color, although other colors and schemes are also possible. For example, each of the panels 242 between the seams 240 may be colored (e.g., alternatingly colored such as red, white, and blue as in an American Basketball Association™ or Harlem Globetrotters™ basketball).

In certain embodiments, the housing 220 comprises upper and lower hemispheres joined together at an interface 221. Preferably, the upper and lower hemispheres can rotate with respect to one another about a substantially vertical axis.

An apparatus 200 including the housing 220 may include a support structure 280 (e.g., comprising one or more legs) to support the housing 220. The support structure 280 may be mechanically coupled to a plurality of base members 282. In certain embodiments, the base members 282 include feet, wheels (e.g., as depicted in FIG. 2), casters, etc. In some embodiments, the support structure 280 and/or base members 282 may complement the decoration. For example, the base members 282 may depict small basketballs. However, the support structure 280 and the base members 282 are not essential features of a decorative housing 220, nor are the position of the aperture 260 or the type of elongate member 262.

Figure 3:
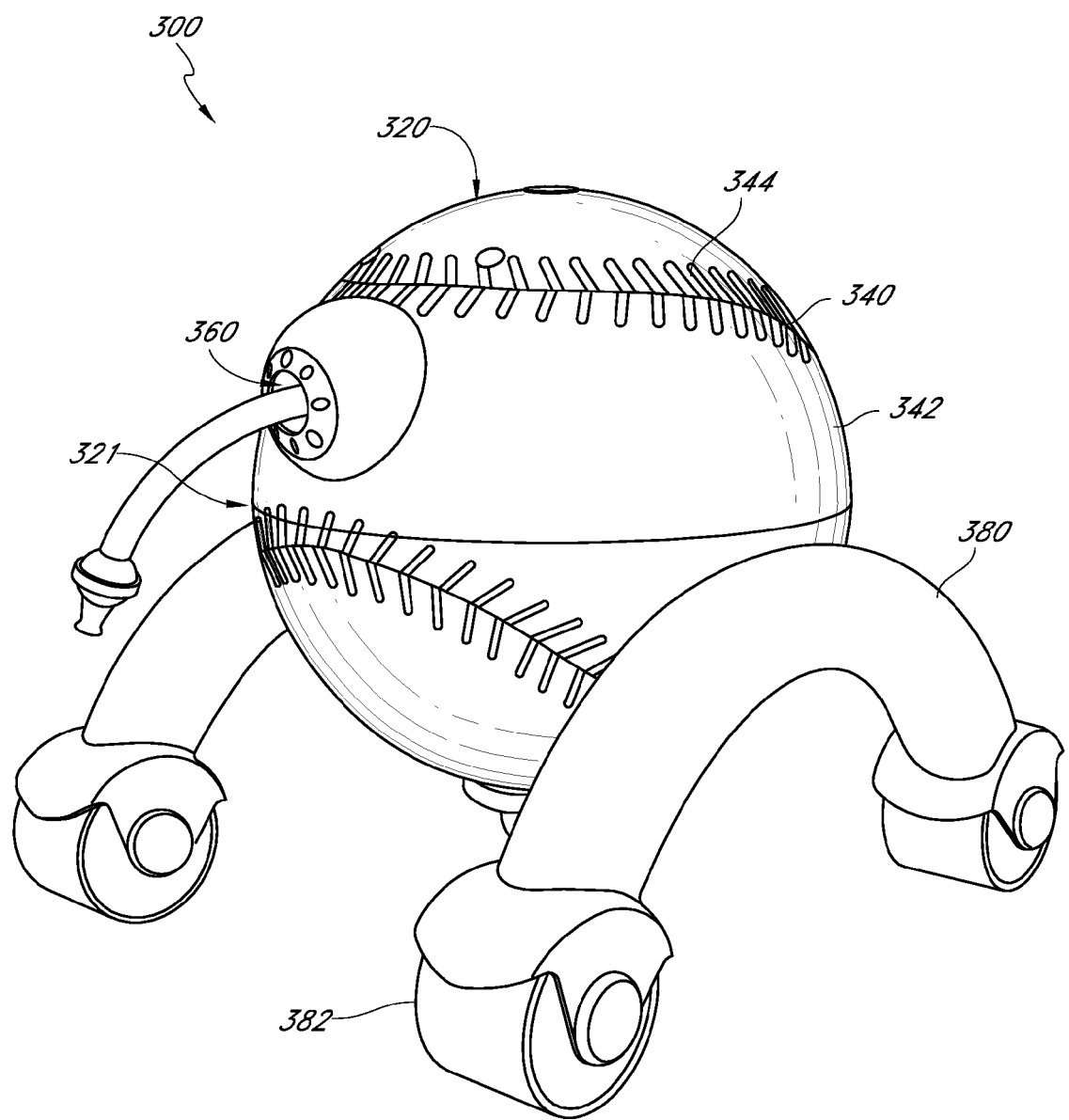
FIG. 3 is a right, front, and top perspective view of an example embodiment of a reel housing configured to have the appearance of a baseball.

FIG. 3 illustrates a housing 320 comprising decoration depicting a ball having markings 340, 342 indicative of the game baseball. The housing 320 includes an opening or aperture 360 through which an elongate member 362 (e.g., comprising a hose, comprising an electrical cable) can extend. Although illustrated in an upper hemisphere of the housing 320, the aperture 360 may be located in any suitable position on the housing 320, for example a central portion or in a lower hemisphere.

In a housing 320 indicative of the game baseball, the markings may comprise a seam 340 separating a plurality of panels 342. In some embodiments, the stitching 340 is at least partially covered by a plurality of stitches 344 (e.g., comprising about 216 stitches or 108 double stitches). The markings 340, 342, 344 may cover the entire housing 320, a portion of the housing 320, or a substantial portion of the housing 320. In certain embodiments, the housing 320, including the markings 340, 342, 344, is substantially smooth. In certain such embodiments, the markings 340, 342, 344 are shaded to simulate the appearance of topography. In some embodiments, the stitches 344 are topographically raised with respect to the panels 342. In certain embodiments, the housing 320 is adapted to have a surface texture consistent with a baseball. For example, the panels 342 may include a leather-type material to simulate the feel and/or appearance of a baseball.

In some embodiments, the housing 320 further comprises text, logos, or the like to depict a certain type of baseball (e.g., Major League Baseball™, National Collegiate Athletic Association™, etc.) or reel manufacturer (e.g., Great Stuff, Inc.™). The housing 320 preferably comprises a traditional off-white color, although other colors and schemes are also possible. For example, each of the panels 342 between the stitching 340 may be bright yellow as in a softball, which looks substantially similar to a baseball. The stitches 344 are preferably green, red, or blue, but may be other colors.

In certain embodiments, the housing 320 comprises upper and lower hemispheres joined together at an interface 321. Preferably, the upper and lower hemispheres can rotate with respect to one another about a substantially vertical axis.

An apparatus 300 including the housing 320 may include a support structure 380 (e.g., comprising one or more legs) to support the housing 320. The support structure 380 may be mechanically coupled to a plurality of base members 382. In certain embodiments, the base members 382 include feet, wheels (e.g., as depicted in FIG. 3), casters, etc. In some embodiments, the support structure 380 and/or base members 382 may complement the decoration. For example, the support structure 380 may depict baseball bats, the base members 382 may depict smaller baseballs, rosin bags, bases, etc. However, the support structure 380 and the base members 382 are not essential features of a decorative housing 320, nor are the position of the aperture 360 or the type of elongate member 362.

Figure 4:
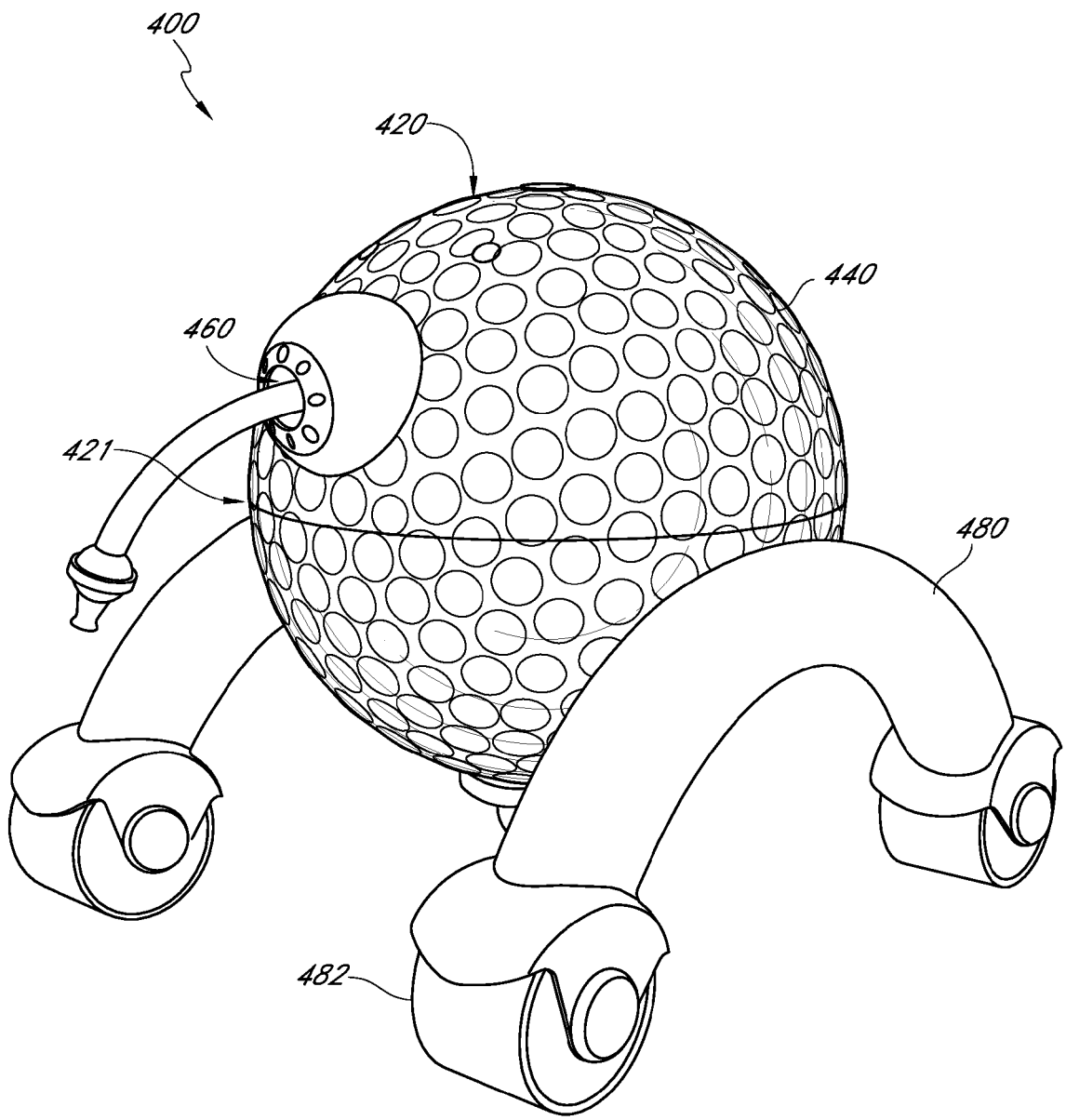
FIG. 4 is a right, front, and top perspective view of an example embodiment of a reel housing configured to have the appearance of a golf ball.

FIG. 4 illustrates a housing 420 comprising decoration depicting a ball having markings 440 indicative of the game golf The housing 420 includes an opening or aperture 460 through which an elongate member 462 (e.g., comprising a hose, comprising an electrical cable) can extend. Although illustrated in an upper hemisphere of the housing 420, the aperture 460 may be located in any suitable position on the housing 420, for example a central portion or in a lower hemisphere.

In a housing 420 indicative of the game golf, the markings may comprise a plurality of substantially circular dimples 440. The markings 440 may cover the entire housing 420, a portion of the housing 420, or a substantial portion of the housing 420. In some embodiments, the dimples 440 are arranged in patterns (e.g., hexagon, octahedron, etc.). The number of dimples 440 is preferably between about 100 and 600, more preferably between about 200 and 500, and even more preferably between about 300 and 400. The dimples 440 may be substantially the same size or may have different sizes. In certain embodiments, the housing 420, including the markings 440, is substantially smooth. In certain such embodiments, the markings 440 are shaded to simulate the appearance of topography. In some embodiments, the housing 420 is adapted to have a surface texture consistent with a golf ball (e.g., a plurality of concave dimples extending into the housing 420). In certain embodiments, the housing 420 includes a plastic-type material to simulate the feel and/or appearance of a golf ball.

In some embodiments, the housing 420 further comprises text, logos, or the like to depict a certain type of golf ball (e.g., Top Flite™, Nike™, etc.) or reel manufacturer (e.g., Great Stuff, Inc.™). In some embodiments, the housing 420 further comprises a numeral (e.g., a single digit numeral used to distinguish golf balls from each other). The housing 420 preferably comprises a traditional white color, although other colors and schemes are also possible, such as yellow, pink, etc. The dimples 440 are preferably the same color as the rest of the housing 420. In some embodiments, the housing includes a band or stripe indicative of a "range" ball.

In certain embodiments, the housing 420 comprises upper and lower hemispheres joined together at an interface 421. Preferably, the upper and lower hemispheres can rotate with respect to one another about a substantially vertical axis.

An apparatus 400 including the housing 420 may include a support structure 480 (e.g., comprising one or more legs) to support the housing 420. The support structure 480 may be mechanically coupled to a plurality of base members 482. In certain embodiments, the base members 482 include feet, wheels (e.g., as depicted in FIG. 4), casters, etc. In some embodiments, the support structure 480 and/or base members 482 may complement the decoration. For example, the support structure 480 may depict golf clubs with the base members 482 depicting club heads, the support structure 480 may depict tees, the base members 482 may depict smaller golf balls, etc. However, the support structure 480 and the base members 482 are not essential features of a decorative housing 420, nor are the position of the aperture 460 or the type of elongate member 462.

Figure 5A:
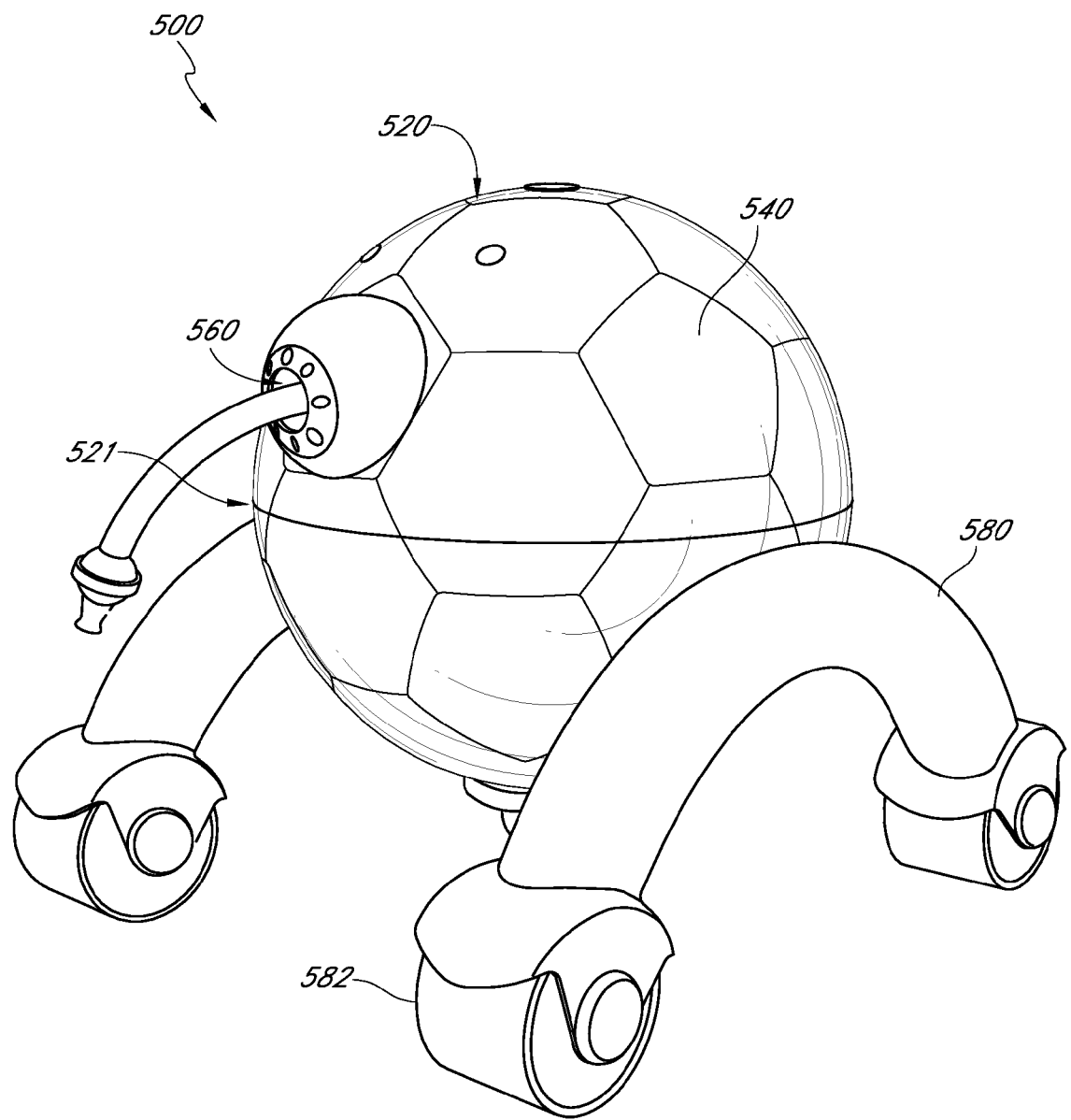
FIGS. 5A-5C are right, front, and top perspective views of example embodiments of reel housings configured to have the appearance of a soccer ball.

FIG. 5A illustrates an example embodiment of a housing 520 comprising decoration depicting a ball having markings 540, 542 indicative of the game soccer (or "football" outside of the United States). The housing 520 includes an opening or aperture 560 through which an elongate member 562 (e.g., comprising a hose, comprising an electrical cable) can extend. Although illustrated in an upper hemisphere of the housing 520, the aperture 560 may be located in any suitable position on the housing 520, for example a central portion or in a lower hemisphere.

In a housing 520 indicative of the game soccer, the markings may comprise a plurality of pentagons 540 and hexagons 542 (e.g., a plurality of hexagons 542 surrounding each pentagon 540, as depicted in FIG. 5A). The markings 540, 542 preferably cover the entire housing 520. However, in some embodiments, the markings 540, 542 cover only a portion or a substantial portion of the housing 520. In some embodiments, the number of pentagons 540 is about 12 and the number of hexagons 542 is about 20. In certain embodiments, the housing 520, including the markings 540, 542, is substantially smooth. In certain such embodiments, the markings 540, 542 are shaded to simulate the appearance of topography. In some embodiments, the pentagons 540 and/or hexagons 542 are topographically depressed near their edges. In certain embodiments, the housing 520 is adapted to have a surface texture consistent with a soccer ball. For example, the markings 540, 542 may include a leather-type material to simulate the feel and/or appearance of a soccer ball.

Figure 5B:
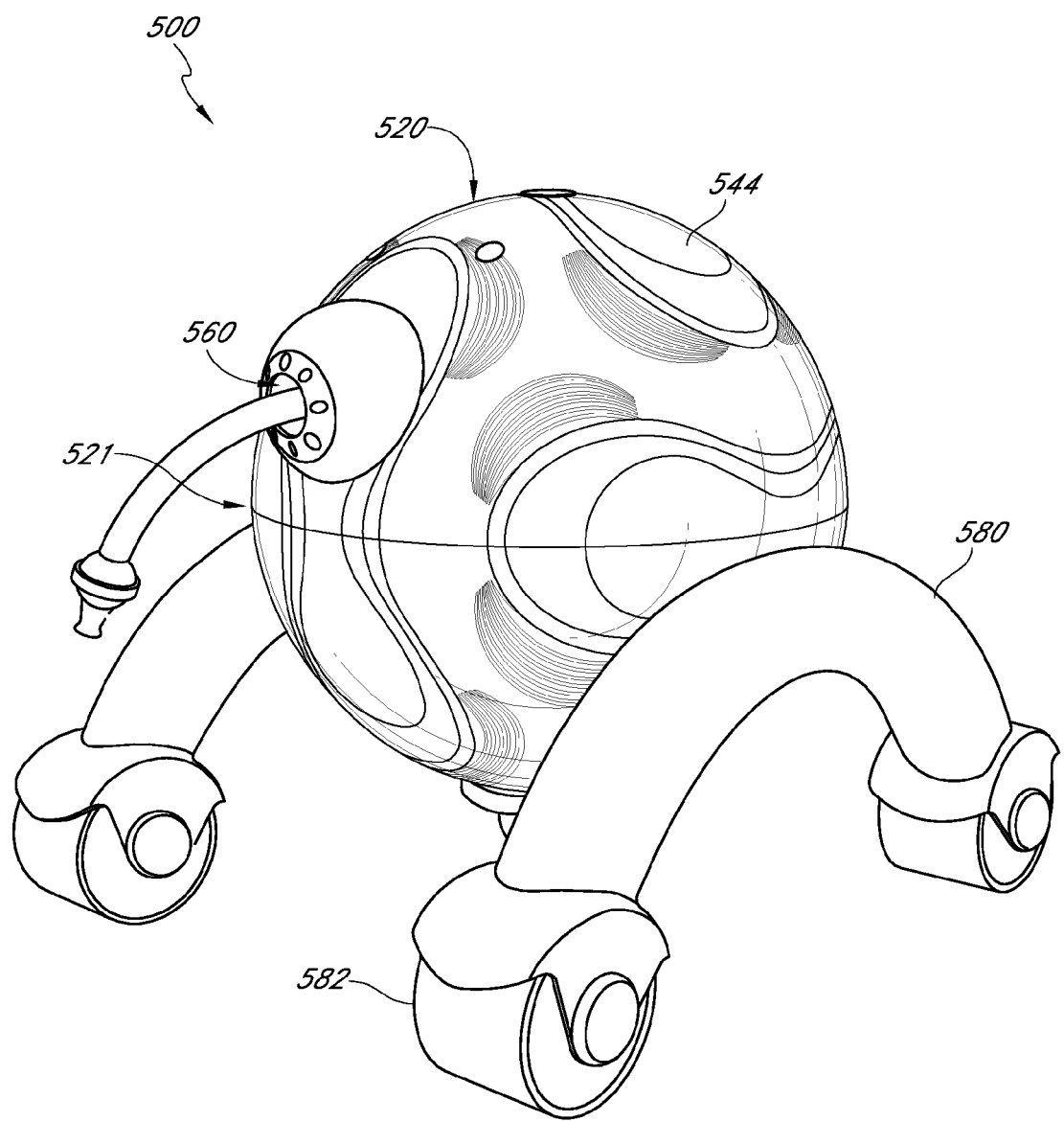
Figure 5C:
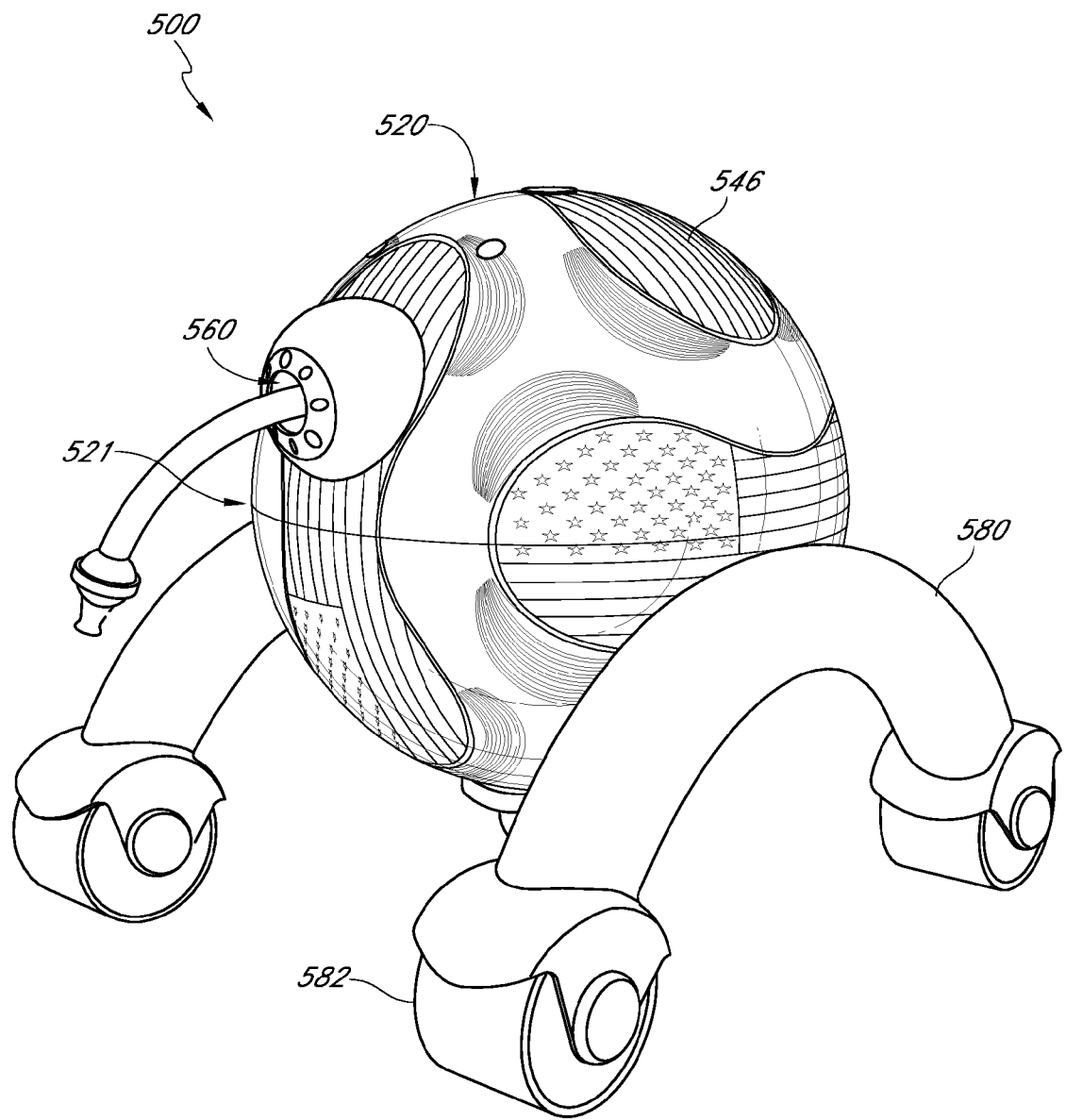

In some embodiments, the housing 520 further comprises text, logos, or the like to depict a certain type of soccer ball (e.g., Federation Internationale de Football Association™, World Cup™, Olympic™, etc.) or reel manufacturer (e.g., Great Stuff, Inc.™). The housing 520 preferably comprises a traditional black pentagon 540 and white hexagon 542 color scheme, although other color schemes are also possible. For example, the housing 520 may be decorated to depict the ball of certain leagues, tournaments, etc., such as FIG. 5B, which illustrates a housing 520 comprising decoration depicting a ball including peanut-shaped Teamgeist™ markings 544, and FIG. 5C, which illustrates a housing 520 comprising decoration depicting a ball including an American flag in peanut-shaped Teamgeist™ markings 546.

In certain embodiments, the housing 520 comprises upper and lower hemispheres joined together at an interface 521. Preferably, the upper and lower hemispheres can rotate with respect to one another about a substantially vertical axis.

An apparatus 500 including the housing 520 may include a support structure 580 (e.g., comprising one or more legs) to support the housing 520. The support structure 580 may be mechanically coupled to a plurality of base members 582. In certain embodiments, the base members 582 include feet, wheels (e.g., as depicted in FIG. 5), casters, etc. In some embodiments, the support structure 580 and/or base members 582 may complement the decoration. For example, the support structure may depict goal posts or shin guards, the base members 582 may depict smaller soccer balls, etc. However, the support structure 580 and the base members 582 are not essential features of a decorative housing 520, nor are the position of the aperture 560 or the type of elongate member 562.

Figure 6:
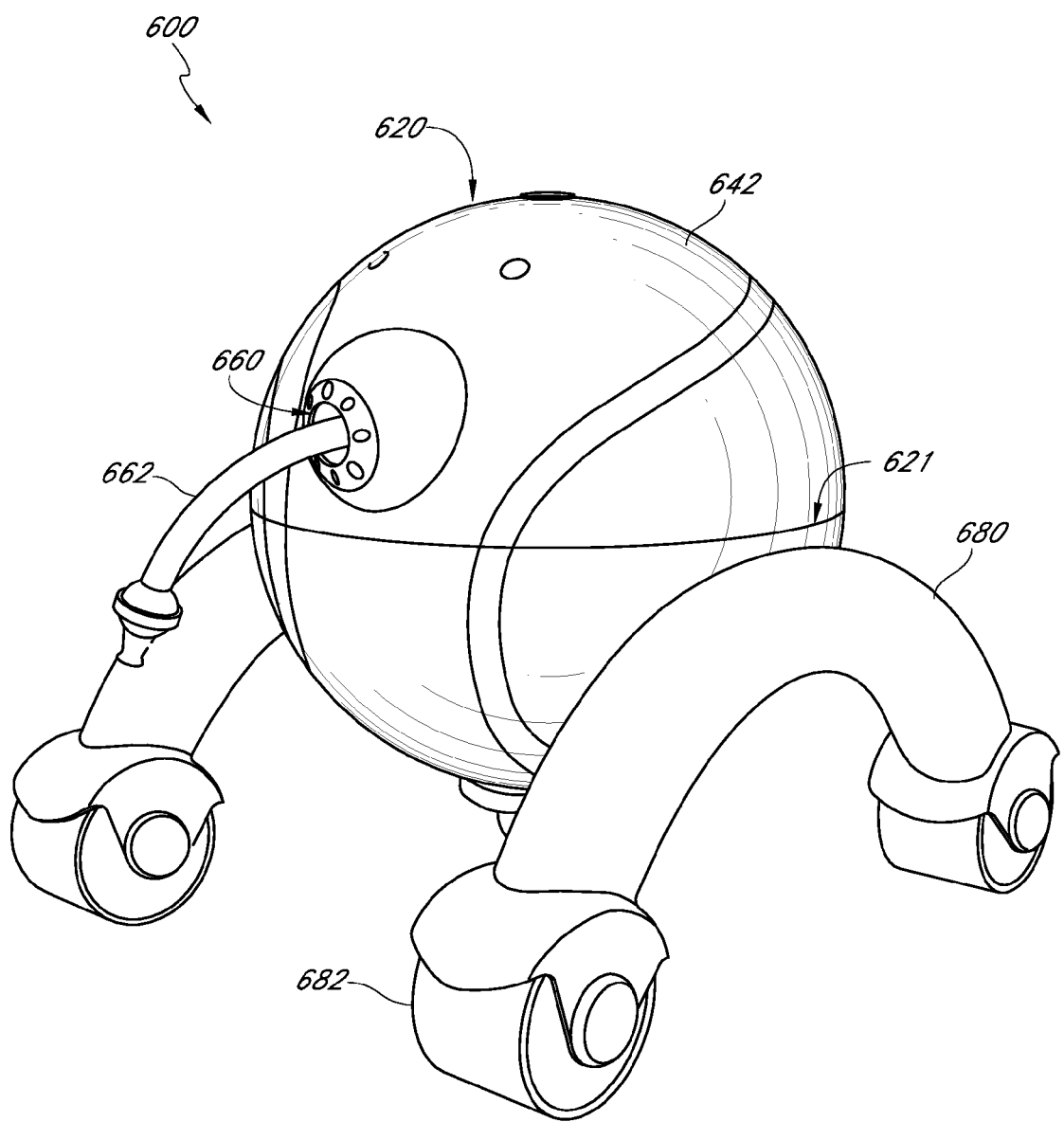
FIG. 6 is a right, front, and top perspective view of an example embodiment of a reel housing configured to have the appearance of a tennis ball.

FIG. 6 illustrates a housing 620 comprising decoration depicting a ball having markings 640, 642 indicative of the game tennis. The housing 620 includes an opening or aperture 660 through which an elongate member 662 (e.g., comprising a hose, comprising an electrical cable) can extend. Although illustrated in an upper hemisphere of the housing 620, the aperture 660 may be located in any suitable position on the housing 620, for example a central portion or in a lower hemisphere.

In a housing 620 indicative of the game tennis, the markings may comprise a seam 640 separating a plurality of panels 642. The markings 640, 642 may cover the entire housing 620, a portion of the housing 620, or a substantial portion of the housing 620. In certain embodiments, the housing 620, including the markings 640, 642, is substantially smooth. In certain such embodiments, the markings 640, 642 are shaded to simulate the appearance of topography. In some embodiments, the seam 640 is topographically depressed with respect to the panels 642. In certain embodiments, the housing 620 is adapted to have a surface texture consistent with a tennis ball. For example, the panels 642 may include a fuzz-covered rubber-type material to simulate the feel and/or appearance of a tennis ball.

In some embodiments, the housing 620 further comprises text, logos, or the like to depict a certain type of tennis ball (e.g., Penn™, Wilson™, etc.) or reel manufacturer (e.g., Great Stuff, Inc.™). The housing 620 preferably comprises a traditional greenish-yellow color, although other colors and schemes are also possible. For example, each of the panels 642 between the seams 640 may be colored (e.g., alternatingly colored), for example, yellow and orange.

In certain embodiments, the housing 620 comprises upper and lower hemispheres joined together at an interface 621. Preferably, the upper and lower hemispheres can rotate with respect to one another about a substantially vertical axis.

An apparatus 600 including the housing 620 may include a support structure 680 (e.g., comprising one or more legs) to support the housing 620. The support structure 680 may be mechanically coupled to a plurality of base members 682. In certain embodiments, the base members 682 include feet, wheels (e.g., as depicted in FIG. 6), casters, etc. In some embodiments, the support structure 680 and/or base members 682 may complement the decoration. For example, the support structure 680 may depict tennis racquets with the base members 682 depicting racquet heads, the base members may depict smaller tennis balls, etc. However, the support structure 680 and the base members 682 are not essential features of a decorative housing 620, nor are the position of the aperture 660 or the type of elongate member 662.

Figure 7:
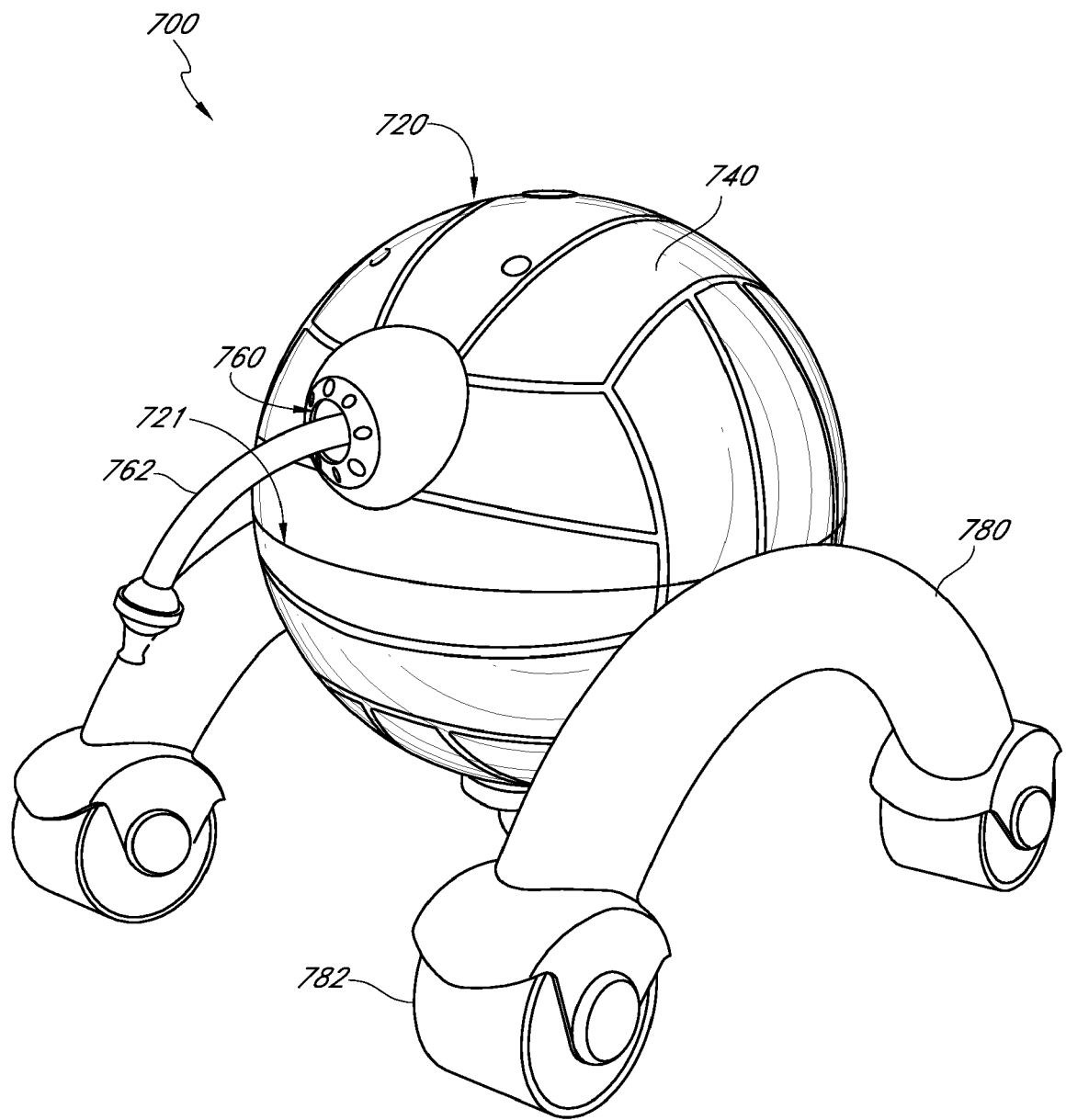
FIG. 7 is a right, front, and top perspective view of an example embodiment of a reel housing configured to have the appearance of a volleyball.

FIG. 7 illustrates a housing 720 comprising decoration depicting a ball having markings 740 indicative of the game volleyball. The housing 720 includes an opening or aperture 760 through which an elongate member 762 (e.g., comprising a hose, comprising an electrical cable) can extend. Although illustrated in an upper hemisphere of the housing 720, the aperture 760 may be located in any suitable position on the housing 720, for example a central portion or in a lower hemisphere.

In a housing 720 indicative of the game volleyball, the markings may comprise a plurality of elongate panels 740. The markings 740 may cover the entire housing 720, a portion of the housing 720, or a substantial portion of the housing 720. In some embodiments, three panels 740 are coupled along their long edges, and the three panels are together coupled to the long edge of another group of three panels 740 at each end comprising the short edges. In certain embodiments, the housing 720, including the markings 740, is substantially smooth. In some embodiments, the markings 740 are shaded to simulate the appearance of topography. In some embodiments, the edges of the panels 740 are topographically depressed. In certain embodiments, the housing 720 is adapted to have a surface texture consistent with a volleyball. For example, the panels 740 may include a leather-type material to simulate the feel and/or appearance of a volleyball.

In some embodiments, the housing 720 further comprises text, logos, or the like to depict a certain type of volleyball (e.g., Association of Volleyball Professionals™, Olympic™) or reel manufacturer (e.g., Great Stuff, Inc.™). The housing 720 preferably comprises a traditional white color, although other colors and schemes are also possible. For example, each of the panels 740 may be colored (e.g., alternatingly colored).

In certain embodiments, the housing 720 comprises upper and lower hemispheres joined together at an interface 721. Preferably, the upper and lower hemispheres can rotate with respect to one another about a substantially vertical axis.

An apparatus 700 including the housing 720 may include a support structure 780 (e.g., comprising one or more legs) to support the housing 720. The support structure 780 may be mechanically coupled to a plurality of base members 782. In certain embodiments, the base members 782 include feet, wheels (e.g., as depicted in FIG. 7), casters, etc. In some embodiments, the support structure 780 and/or base members 782 may complement the decoration. For example, the base members 782 may depict smaller volleyballs. However, the support structure 780 and the base members 782 are not essential features of a decorative housing 720, nor are the position of the aperture 760 or the type of elongate member 762.

Figure 8:
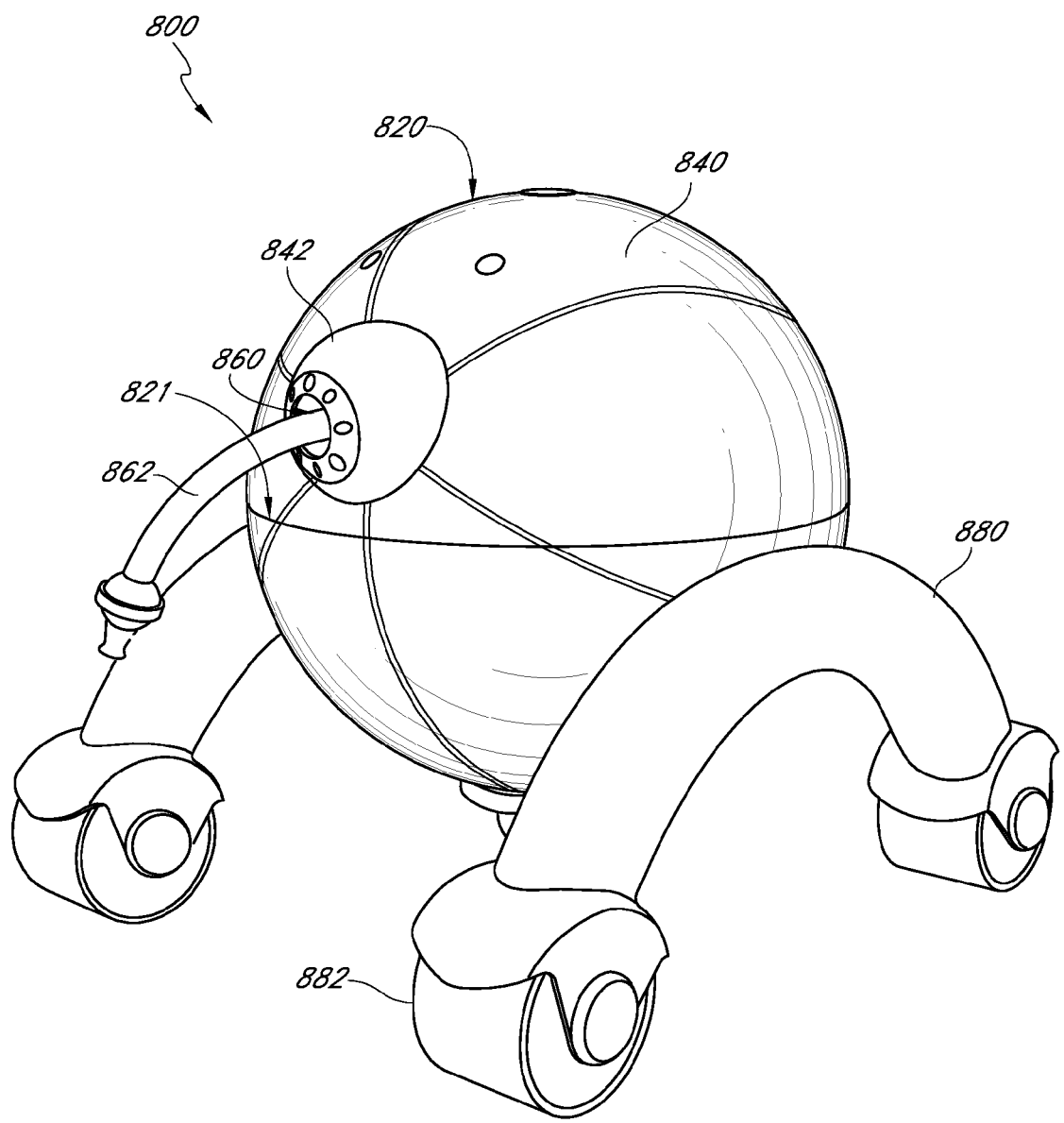
FIG. 8 is a right, front, and top perspective view of an example embodiment of a reel housing configured to have the appearance of a beach ball.

FIG. 8 illustrates a housing 820 comprising decoration depicting a ball having markings 840, 842 indicative of beach recreation (i.e., a "beach ball"). The housing 820 includes an opening or aperture 860 through which an elongate member 862 (e.g., comprising a hose, comprising an electrical cable) can extend. Although illustrated in an upper hemisphere of the housing 820, the aperture 860 may be located in any suitable position on the housing 820, for example a central portion or in a lower hemisphere.

In a housing 820 indicative of a beach ball, the markings may comprise a plurality of elongate panels 840 and at least one round (e.g., circular) panel 842. The markings 840, 842 may cover the entire housing 820, a portion of the housing 820, or a substantial portion of the housing 820. In some embodiments, six elongate panels 840 are coupled along their long edges, and are coupled to the round panels 842 at each short edge. In certain embodiments, the housing 820, including the markings 840, 842, is substantially smooth. In certain such embodiments, the markings 840, 842 are shaded to simulate the appearance of topography. In some embodiments, the edges of the panels 840, 842 are topographically raised or lowered to simulate the seams in a beach ball. In certain embodiments, the housing 820 is adapted to have a surface texture consistent with a beach ball. For example, the panels 840, 842 may include a plastic material to simulate the feel and/or appearance of a beach ball.

In some embodiments, the housing 820 further comprises text, logos, or the like to depict a certain type of beach ball or reel manufacturer (e.g., Great Stuff, Inc.™). The housing 820 preferably comprises a traditional color scheme (alternating white-blue-white-yellow-white-red panels 840 and white panels 842), although other color schemes are also possible. In some embodiments, the aperture 860 is in the place of a panel 842, and the elongate member 862 is in a position such as the nozzle of a beach ball.

In certain embodiments, the housing 820 comprises upper and lower hemispheres joined together at an interface 821. Preferably, the upper and lower hemispheres can rotate with respect to one another about a substantially vertical axis.

An apparatus 800 including the housing 820 may include a support structure 880 (e.g., comprising one or more legs) to support the housing 820. The support structure 880 may be mechanically coupled to a plurality of base members 882. In certain embodiments, the base members 882 include feet, wheels (e.g., as depicted in FIG. 8), casters, etc. In some embodiments, the support structure 880 and/or base members 882 may complement the decoration. For example, the support structure 880 may depict shovels with the base members 882 depicting shovel heads, the base members 882 may depict pails, the base members 882 may depict smaller beach balls, etc. However, the support structure 880 and the base members 882 are not essential features of a decorative housing 820, nor are the position of the aperture 860 or the type of elongate member 862.

Decoration depicting a ball having markings indicative of other games are also possible, for example and without limitation cricket balls (e.g., having panels, seams, and stitches), numbered billiard balls (e.g., being "striped" or "solid"), bowling balls (e.g., having markings indicative of finger holes), wiffle balls (e.g., having markings indicative of air holes), etc. Decoration depicting a ball having markings indicating games that do not have substantially spherical balls are also possible. For example, an American football (e.g., having brown panels and white stitches), rugby, etc.

Figure 9A:
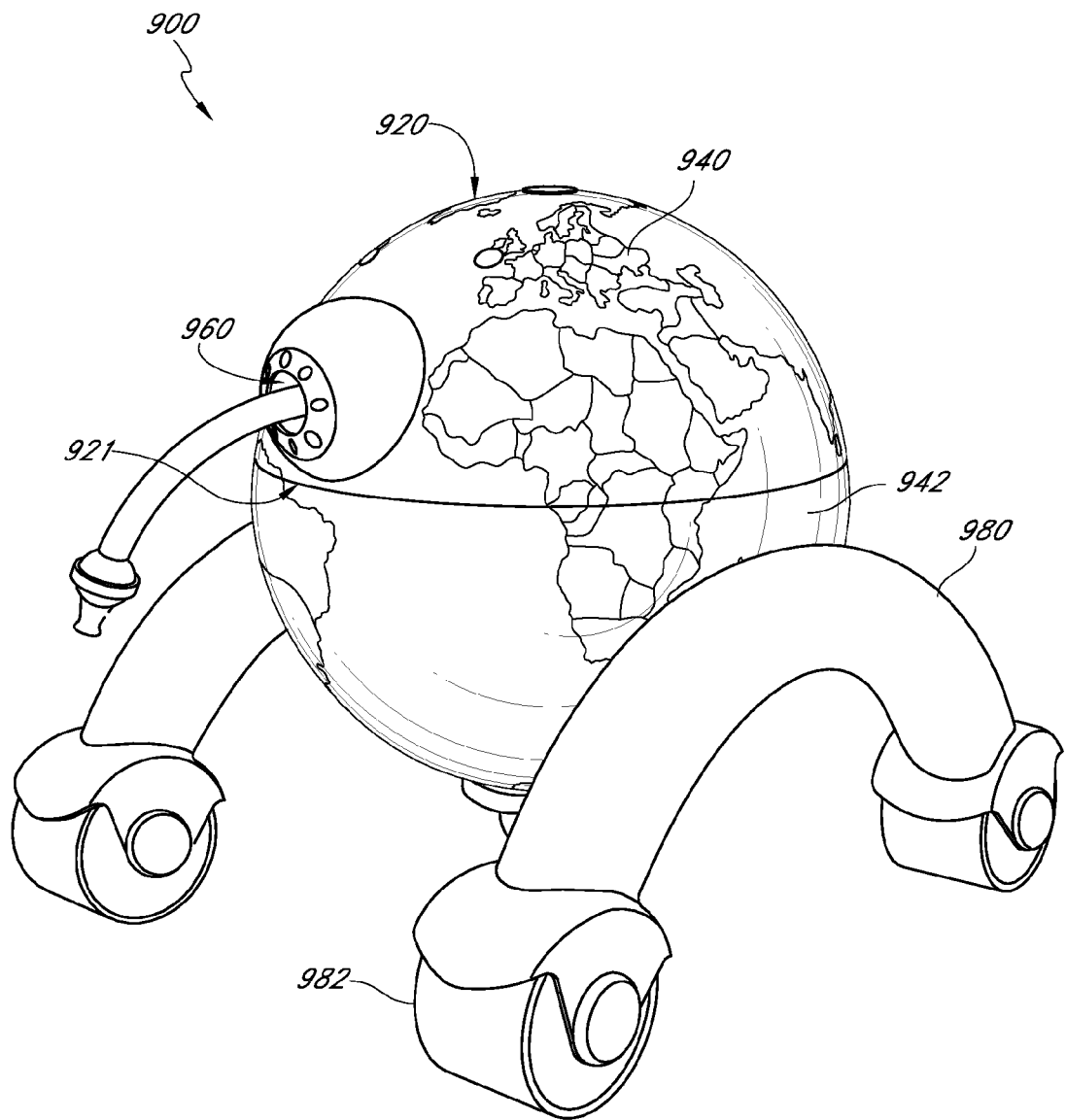
FIGS. 9A and 9B are right, front, and top perspective views of example embodiments of reel housings configured to have the appearance of a globe.

FIG. 9A illustrates a housing 920 comprising decoration 940, 942 depicting a globe. The housing 920 includes an opening or aperture 960 through which an elongate member 962 (e.g., comprising a hose, comprising an electrical cable) can extend. Although illustrated in an upper hemisphere of the housing 920, the aperture 960 may be located in any suitable position on the housing 920, for example a central portion or in a lower hemisphere.

In a housing 920 indicative of a globe, the globe may depict the planet Earth. In certain embodiments, the Earth is depicted as a map (e.g., having colored continents and/or countries, comprising longitude and/or latitude lines, etc.). In certain such embodiments, the decoration 940 depicts land and the decoration 942 depicts water. In some embodiments, the aperture 960 is positioned such that the elongate member 962 appears to come out of water, land, a particular area of the globe, etc. In certain embodiments, the housing 920, including the markings 940, 942, is substantially smooth. In certain such embodiments, the markings 940, 942 are shaded to simulate the appearance of topography. In some embodiments, the housing 920 is adapted to have a surface texture consistent with a globe (e.g., portions of the land 940 at least partially topographically raised to simulate mountains, plains, etc.).

Figure 9B:
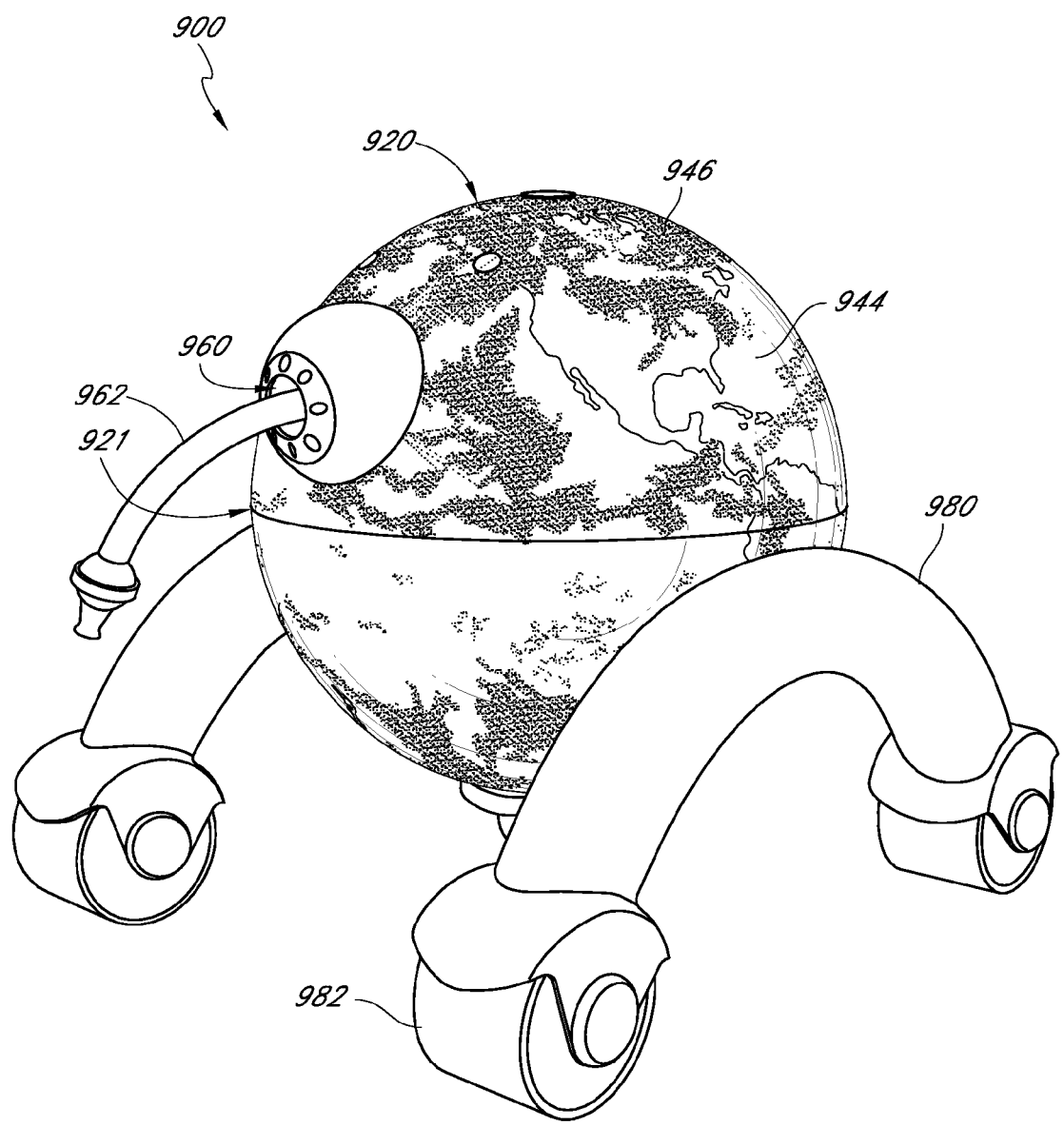

In certain other embodiments, the Earth is depicted from space (e.g., having colors corresponding to water 944, mountains, desert, forest, ice, clouds 946, etc., as depicted in FIG. 9B). In certain other embodiments, the Earth is depicted as an "old world" map (e.g., having continents or countries that are misshapen, comprising a detailed compass, etc.). In some embodiments, the Earth is depicted as tilted on an axis (e.g., by between about 5 and 30 degrees, between about 20 and 25 degrees, or about 23.45°). In some embodiments, the Earth is depicted as not tilted on an axis (e.g., the equator separating an upper half of the housing from a lower half of the housing).

Decoration depicting other celestial bodies are also possible, for example and without limitation, the moon (e.g., comprising a gray color and markings indicative of craters), Venus (e.g., comprising a marbled off-white color), Mercury (e.g., comprising a marbled orange color), Mars (e.g., comprising a marbled red color), Jupiter (e.g., comprising a red dot), Saturn (e.g., comprising markings indicative of rings), Uranus (e.g., comprising a marbled blue color), Neptune (e.g., comprising a marbled dark blue color), etc.

In some embodiments, the housing 920 further comprises text, logos, or the like to denote a certain type or year of globe, to delineate countries or continents, etc. to identify a reel manufacturer (e.g., Great Stuff, Inc.™). The housing 920 preferably comprises traditional colors such as blue for water, although other colors and schemes are also possible.

In certain embodiments, the housing 920 comprises upper and lower hemispheres joined together at an interface 921. Preferably, the upper and lower hemispheres can rotate with respect to one another about a substantially vertical axis.

An apparatus 900 including the housing 920 may include a support structure 980 (e.g., comprising one or more legs) to support the housing 920. The support structure 980 may be mechanically coupled to a plurality of base members 982. In certain embodiments, the base members 982 include feet, wheels (e.g., as depicted in FIG. 9), casters, etc. In some embodiments, the support structure 980 and/or base members 982 may complement the decoration. For example, the support structure 980 may depict telescopes, the base members 982 may depict other celestial bodies, etc. However, the support structure 980 and the base members 982 are not essential features of a decorative housing 920, nor are the position of the aperture 960 or the type of elongate member 962.

Figure 10:
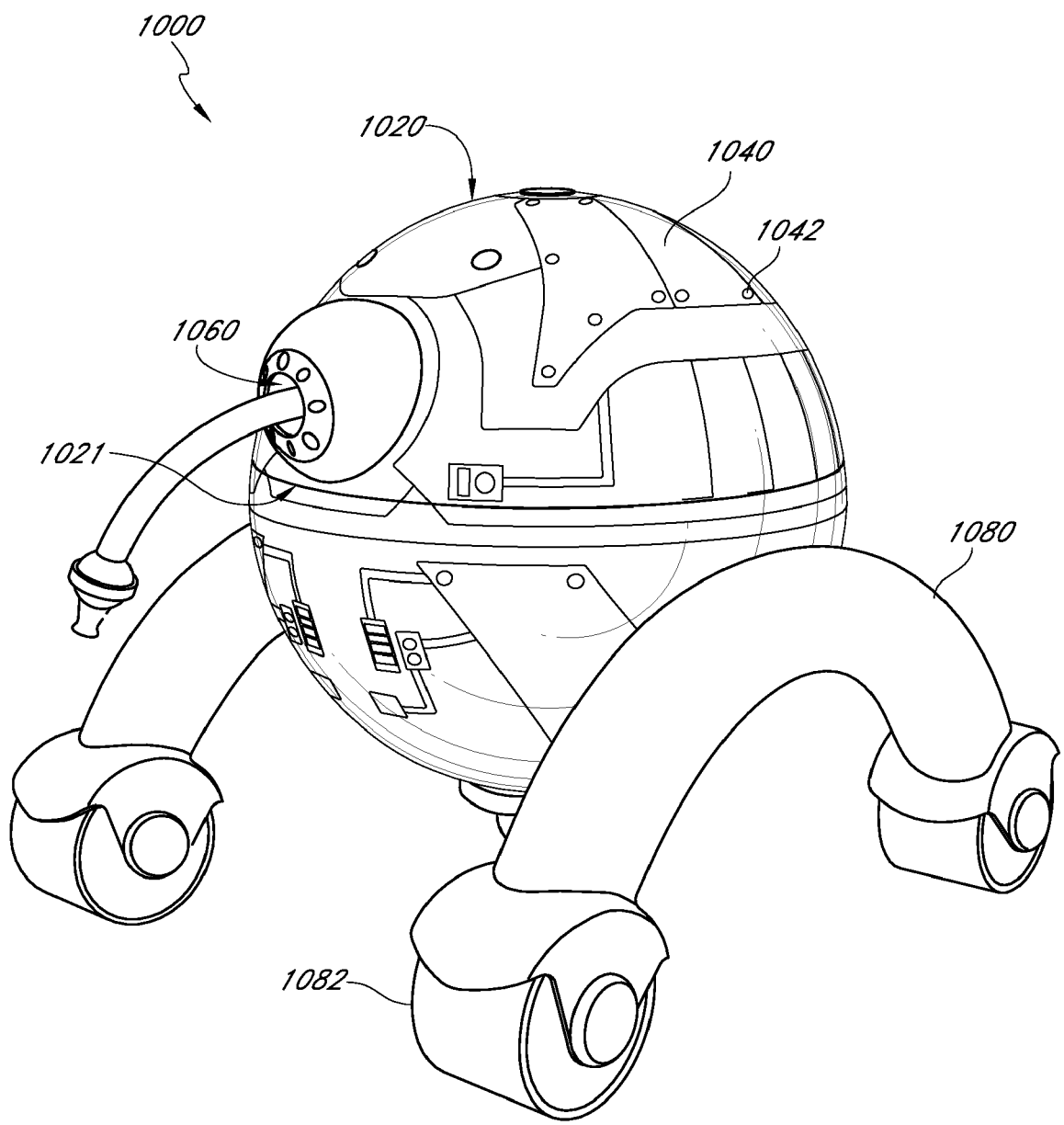
FIG. 10 is a right, front, and top perspective view of an example embodiment of a reel housing configured to have the appearance of a robot.

FIG. 10 illustrates a housing 1020 comprising decoration 1040, 1042 depicting a robot. The housing 1020 includes an opening or aperture 1060 through which an elongate member 1062 (e.g., comprising a hose, comprising an electrical cable) can extend. Although illustrated in an upper hemisphere of the housing 1020, the aperture 1060 may be located in any suitable position on the housing 1020, for example a central portion or in a lower hemisphere.

In a housing 1020 depicting a robot, the decoration may comprise panels 1040 and rivets 1042. The decoration 1040, 1042 may cover the entire housing 1020, a portion of the housing 1020, or a substantial portion of the housing 1020. In certain embodiments, the housing 1020, including the decoration 1040, 1042, is substantially smooth. In certain such embodiments, the decorations 1040, 1042 are shaded to simulate the appearance of topography. In some embodiments, the panels 1040 and/or rivets 1042 are topographically raised with respect to each other to simulate layering and assembly. In certain embodiments, the housing 1020 is adapted to have a surface texture consistent with a robot. In certain embodiments, the panels 1042 and/or rivets 1042 include a metallic material to simulate the feel and/or appearance of a robot. In some embodiments, the housing 1020 comprises one or more light emitting diodes that receive power from the apparatus 1000 (e.g., being indicative of the status of the apparatus 1000).

In certain embodiments, the housing 1020 comprises upper and lower hemispheres joined together at an interface 1021.

Preferably, the upper and lower hemispheres can rotate with respect to one another about a substantially vertical axis.

An apparatus 1000 including the housing 1020 may include a support structure 1080 (e.g., comprising one or more legs) to support the housing 1020. The support structure 1080 may be mechanically coupled to a plurality of base members 1082. In certain embodiments, the base members 1082 include feet (e.g., as depicted in FIG. 10), wheels, casters, etc. In some embodiments, the support structure 1080 and/or base members 1082 may complement the decoration. For example, the base members 1082 may depict the wheels of a robot. However, the support structure 1080 and the base members 1082 are not essential features of a decorative housing 1020, nor are the position of the aperture 1060 or the type of elongate member 1062.

Figure 11:
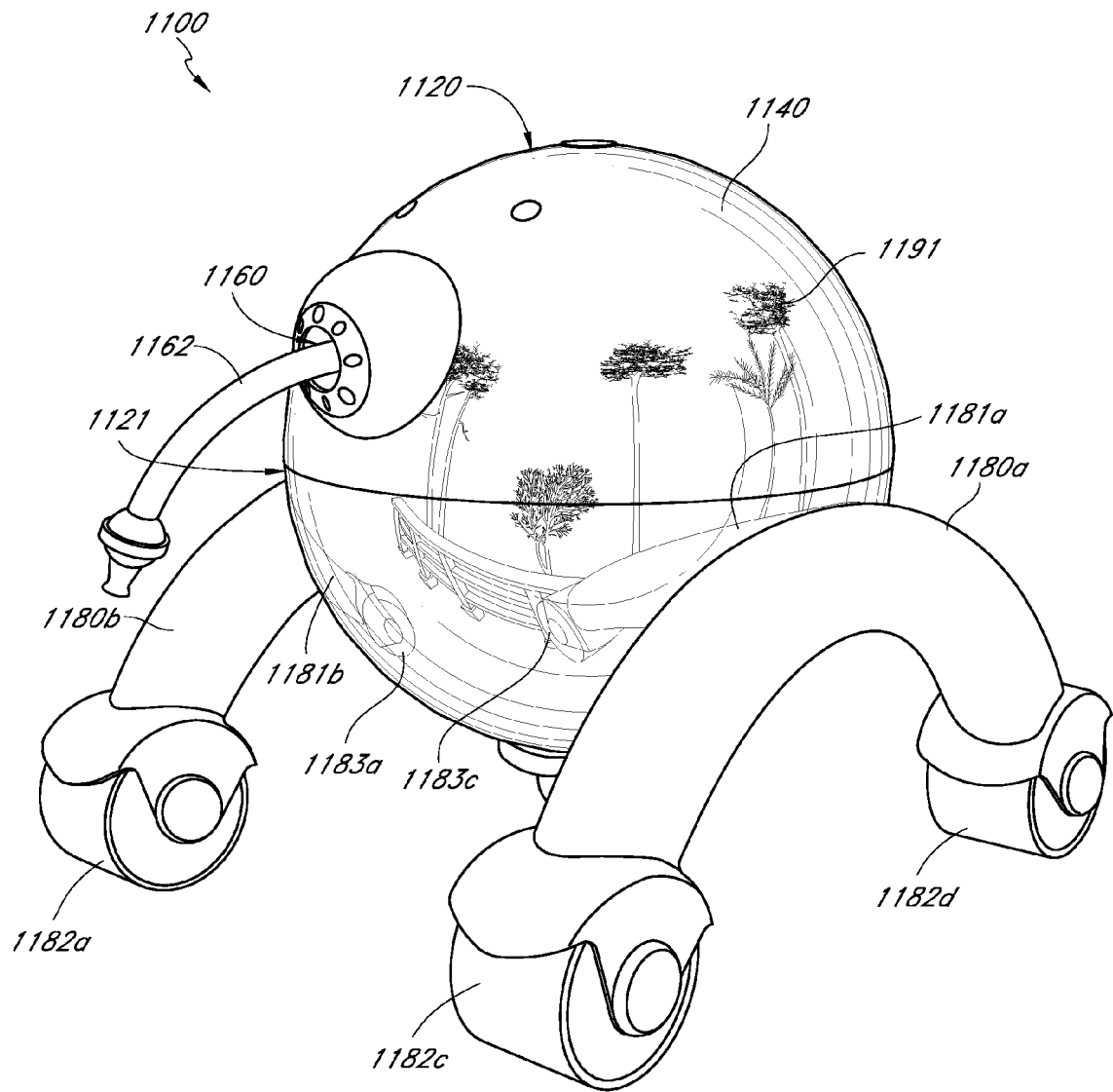
FIG. 11 is a right, front, and top perspective view of an example embodiment of a reel housing configured to have the appearance of a gazing ball.

FIG. 11 illustrates a housing 1120 comprising decoration indicative of a gazing ball (also known as a lawn ball, garden ball, gazing globe, mirror ball, and chrome ball). The housing 1120 includes an opening or aperture 1160 through which an elongate member 1162 (e.g., comprising a hose, comprising an electrical cable) can extend. Although illustrated in an upper hemisphere of the housing 1120, the aperture 1160 may be located in any suitable position on the housing 1120, for example a central portion or in a lower hemisphere.

In a housing 1120 depicting a gazing ball, the decoration may comprise a reflective surface 1140. The decoration 1140 may cover the entire housing 1120, a portion of the housing 1120, or a substantial portion of the housing 1120. In certain embodiments, the housing 1120, including the decoration 1140, is substantially smooth and has a reflective metallic appearance. For example, the decoration 1140 may comprise paint that makes the housing 1120 appear to be made of stainless steel, chrome, ceramic, glass, and the like. As illustrated in FIG. 11, the decoration 1140 reflects the surroundings. For example, the support structures 1180a, 1180b are reflected as 1181a, 1181b, the base member 1182a is reflected as 1183a, and a tree 1190 is reflected as 1191. A housing 1120 decorated as a gazing ball advantageously allows a user to match the housing 1120 to other lawn ornaments such as gazing balls and allows a user to replace or avoid purchasing non-functional lawn ornaments such as purely decorative gazing balls.

In certain embodiments, the housing 1120 comprises upper and lower hemispheres joined together at an interface 1121. Preferably, the upper and lower hemispheres can rotate with respect to one another about a substantially vertical axis.

An apparatus 1100 including the housing 1120 may include a support structure 1180a, 1180b (e.g., comprising one or more legs), collectively the support structure 1180, to support the housing 1120. The support structure 1180 may be mechanically coupled to a plurality of base members 1182a, 1182b (not shown), 1182c, 1182d, collectively the base members 1182. In certain embodiments, the base members 1182 include feet (e.g., as depicted in FIG. 11), wheels, casters, etc. In some embodiments, the support structure 1180 and/or base members 1182 may complement the decoration. For example, the base members 1182 may appear to be made of conical ceramic, wrought iron, or any traditional gazing ball stand. However, the support structure 1180 and the base members 1182 are not essential features of a decorative housing 1120, nor are the position of the aperture 1160 or the type of elongate member 1162.

Figure 12A:
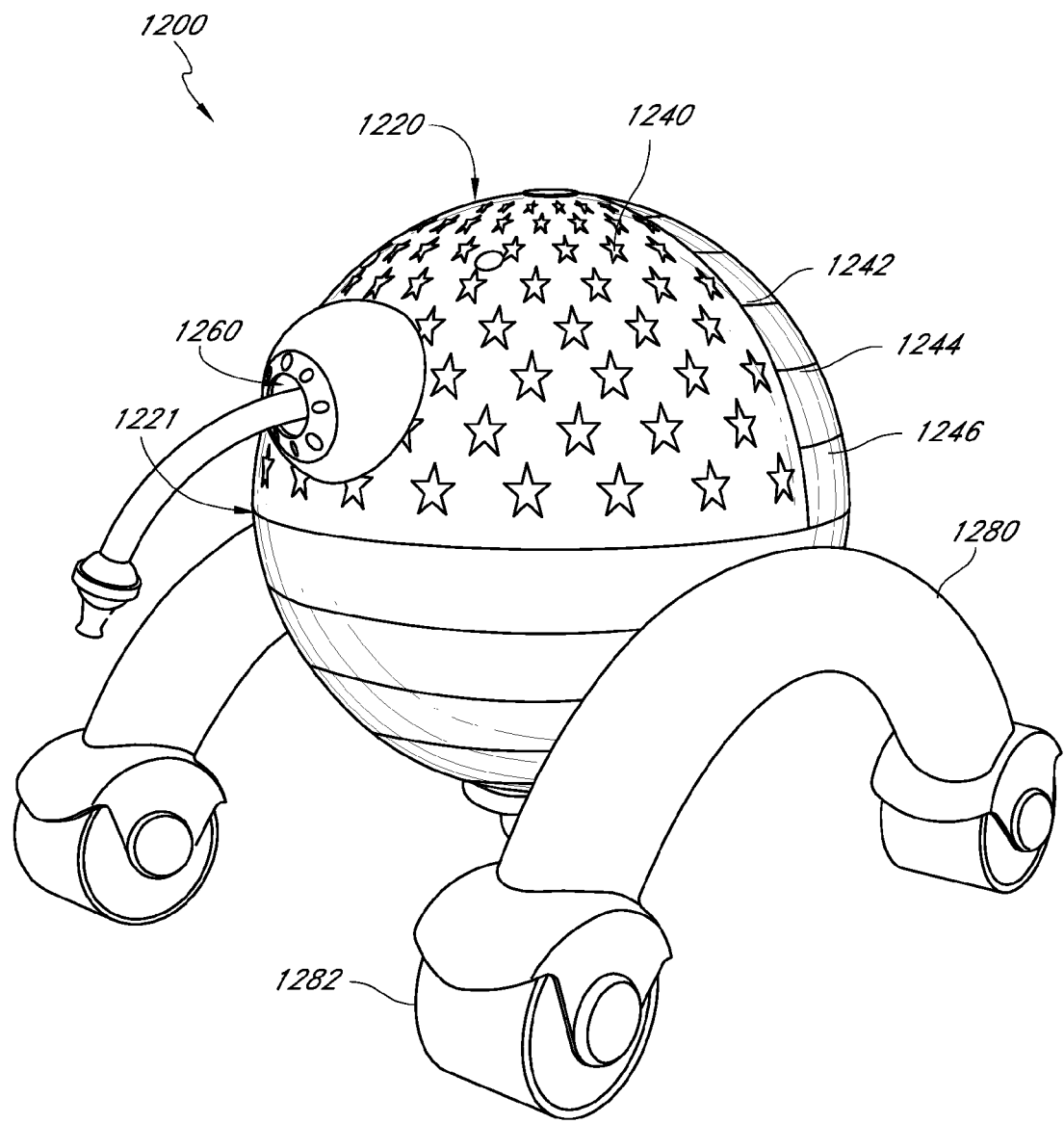
FIGS. 12A and 12B are right, front, and top perspective views of example embodiments of reel housings configured to have the appearance of a flag.
Figure 12B:
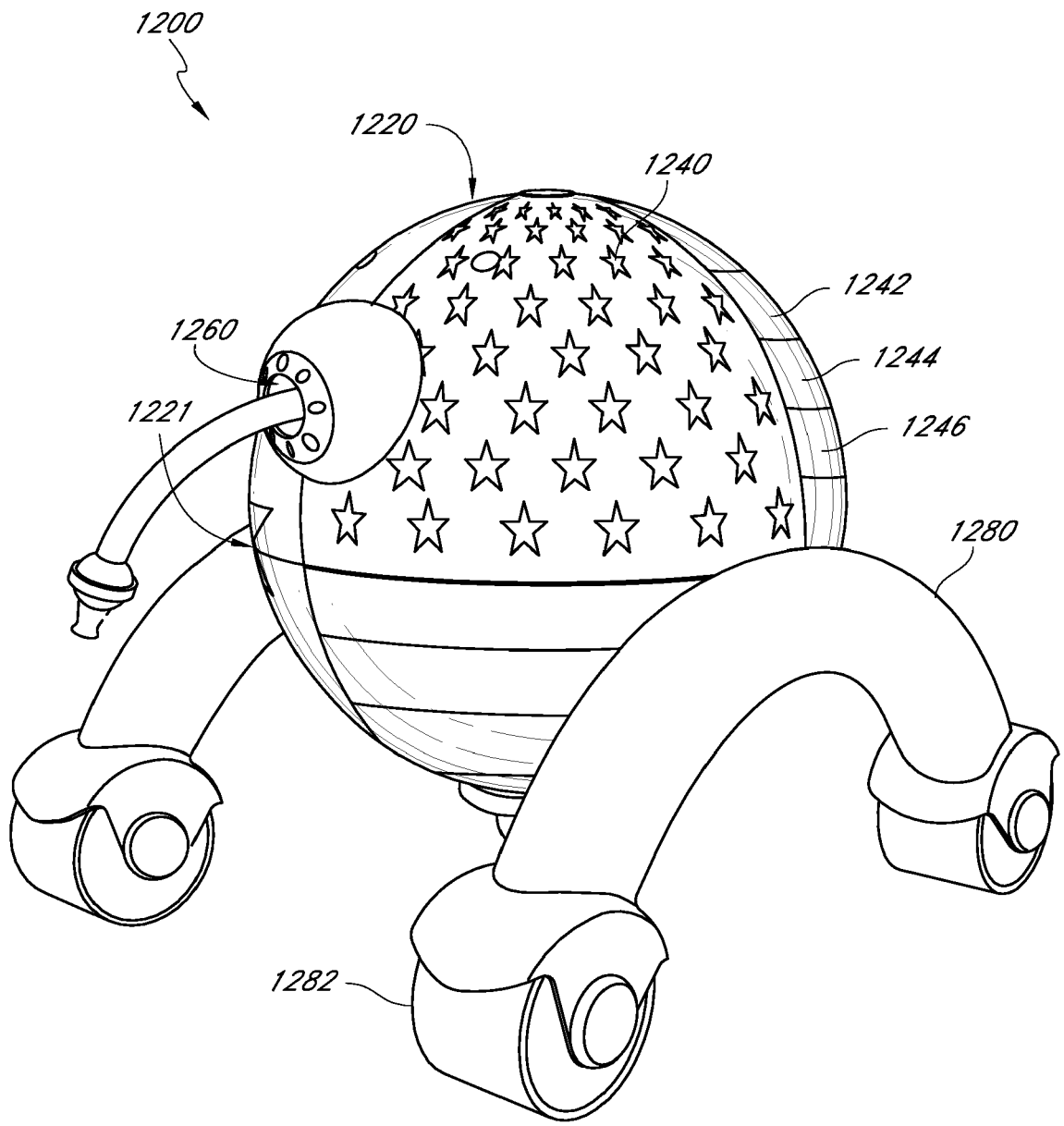
Figure 12C:
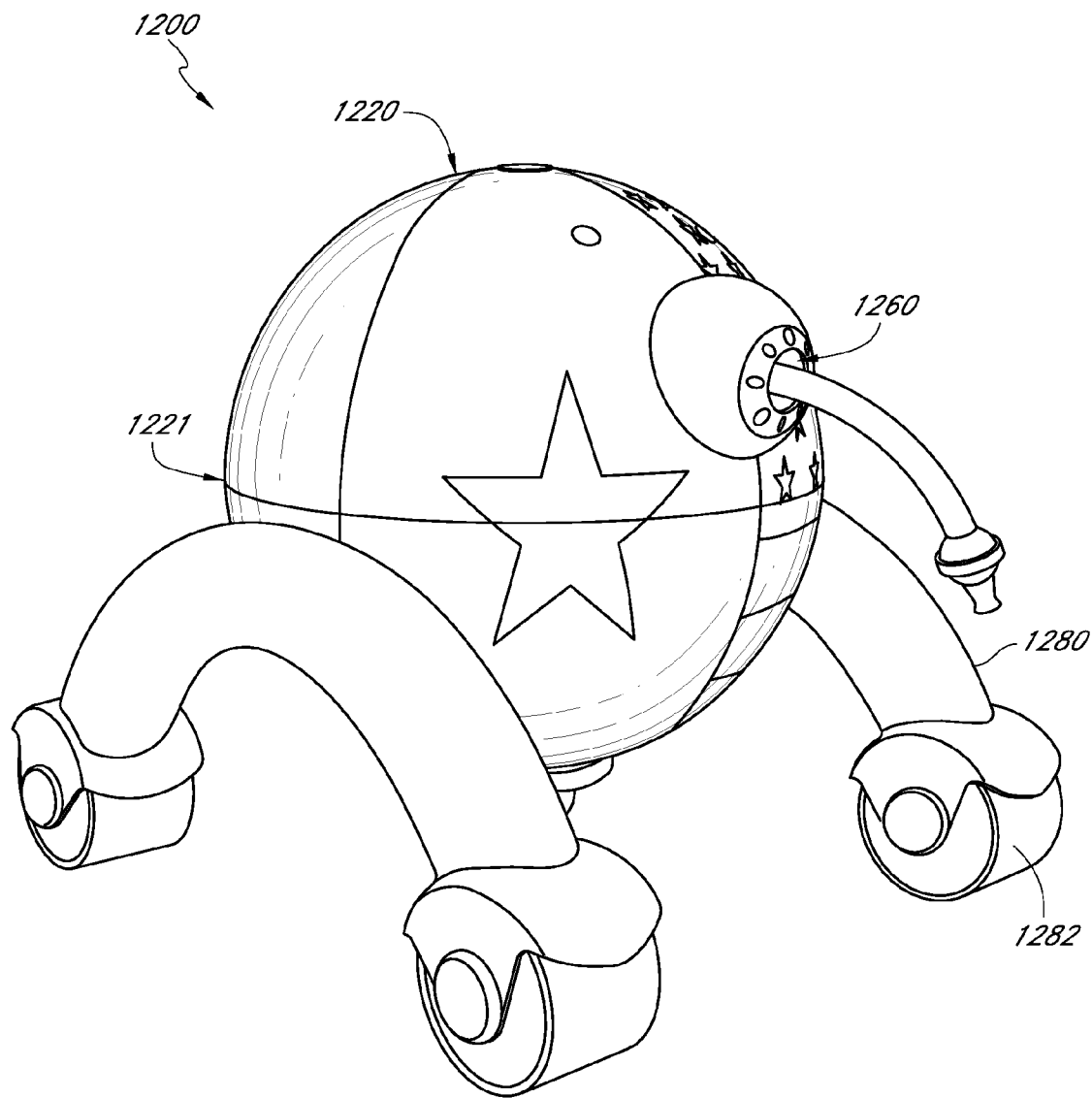
FIG. 12C is a left, front, and top perspective view of the reel housing of FIG. 12B.

FIGS. 12A-12C illustrate housings 1220 comprising decoration indicative of a flag. The housing 1220 includes an opening or aperture 1260 through which an elongate member 1262 (e.g., comprising a hose, comprising an electrical cable) can extend. Although illustrated in an upper hemisphere of the housing 1220, the aperture 1260 may be located in any suitable position on the housing 1220, for example a central portion or in a lower hemisphere.

In a housing 1220 indicative of a flag, the flag may comprise the United States flag. In certain embodiments, the United States flag is depicted as projected onto a spherical surface. In certain such embodiments, the decoration comprises white stars 1240 on a blue background 1242 and alternative white stripes 1244 and red stripes 1246. Other color schemes are also possible. In some embodiments, the aperture 1260 is positioned such that the elongate member 1262 appears to come out of the stars 1240. In certain embodiments, the housing 1220, including the markings 1240, 1242, 1244, 1246, is substantially smooth. In certain such embodiments, the markings 1240, 1242, 1244, 1246 are shaded to simulate the appearance of topography (e.g., stitching). In some embodiments, the housing 1220 is adapted to have a surface texture consistent with a flag (e.g., comprising polyester or other durable cloths). Decoration depicting other flags or combinations of flags are also possible, for example and without limitation, a combination of the United States and Texas flags (e.g., as depicted in a perspective view from the United States flag side in FIGS. 12B and in a perspective view from the Texas flag side in FIG. 12C), the Canadian flag, the United Kingdom flag, the Australian flag, etc.

In certain embodiments, the housing 1220 comprises upper and lower hemispheres joined together at an interface 1221. Preferably, the upper and lower hemispheres can rotate with respect to one another about a substantially vertical axis.

An apparatus 1200 including the housing 1220 may include a support structure 1280 (e.g., comprising one or more legs) to support the housing 1220. The support structure 1280 may be mechanically coupled to a plurality of base members 1282. In certain embodiments, the base members 1282 include feet, wheels (e.g., as depicted in FIG. 12), casters, etc. In some embodiments, the support structure 1280 and/or base members 1282 may complement the decoration. However, the support structure 1280 and the base members 1282 are not essential features of a decorative housing 1220, nor are the position of the aperture 1260 or the type of elongate member 1262.

FIGS. 13A-13F each illustrate a housing 1320 comprising decoration depicting camouflage. In certain embodiments, the camouflage decoration allows the housing 1320 to be substantially indiscernible from the surrounding environment. The housing 1320 includes an opening or aperture 1360 through which an elongate member 1362 (e.g., comprising a hose, comprising an electrical cable) can extend. Although illustrated in an upper hemisphere of the housing 1320 in FIGS. 13A and 13B, the aperture 1360 may be located in any suitable position on the housing 1320, for example a central portion (e.g., as illustrated in FIGS. 13C-13F) or in a lower hemisphere.

Figure 13A:
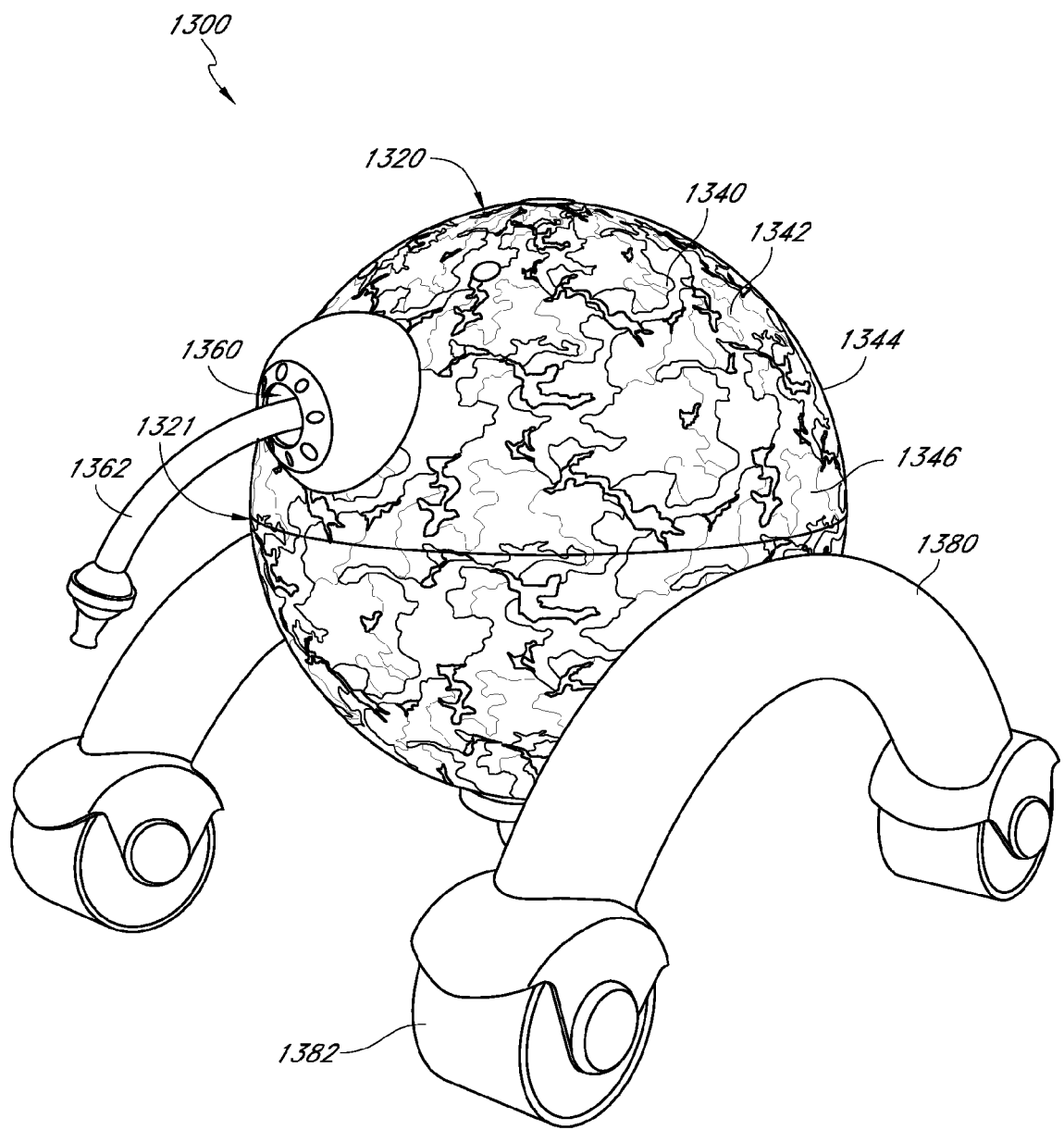
FIGS. 13A-13F are right, front, and top perspective views of example embodiments of reel housings configured to have the appearance of camouflage.

In the housing 1320 comprising decoration depicting camouflage shown in FIG. 13A, the markings comprise a plurality of intertwined color patches 1340, 1342, 1344, 1346. The markings 1340, 1342, 1344, 1346 may cover the entire housing 1320, a portion of the housing 1320, or a substantial portion of the housing 1320. In certain embodiments, the housing 1320, including the markings 1340, 1342, 1344, 1346 is substantially smooth. Any variety of colors may be used for the color patches 1340, 1342, 1344, 1346, including, but not limited to, various shades of green, brown, gray, and white. For another example, the colors of the patches in FIG. 13A may be brown for the patches 1340, black for the patches 1342, dark green for the patches 1344, and light green for the patches 1346 (e.g., woodland camouflage). For example, the colors of the patches in FIG. 13B may be light brown for the patches 1348, dark brown for the patches 1350, white outlined in black for the patches 1352, tan for the patches 1354, and very light green for the patches 1356 (e.g., desert camouflage). Any number or combination of colors may be used.

Figure 13B:
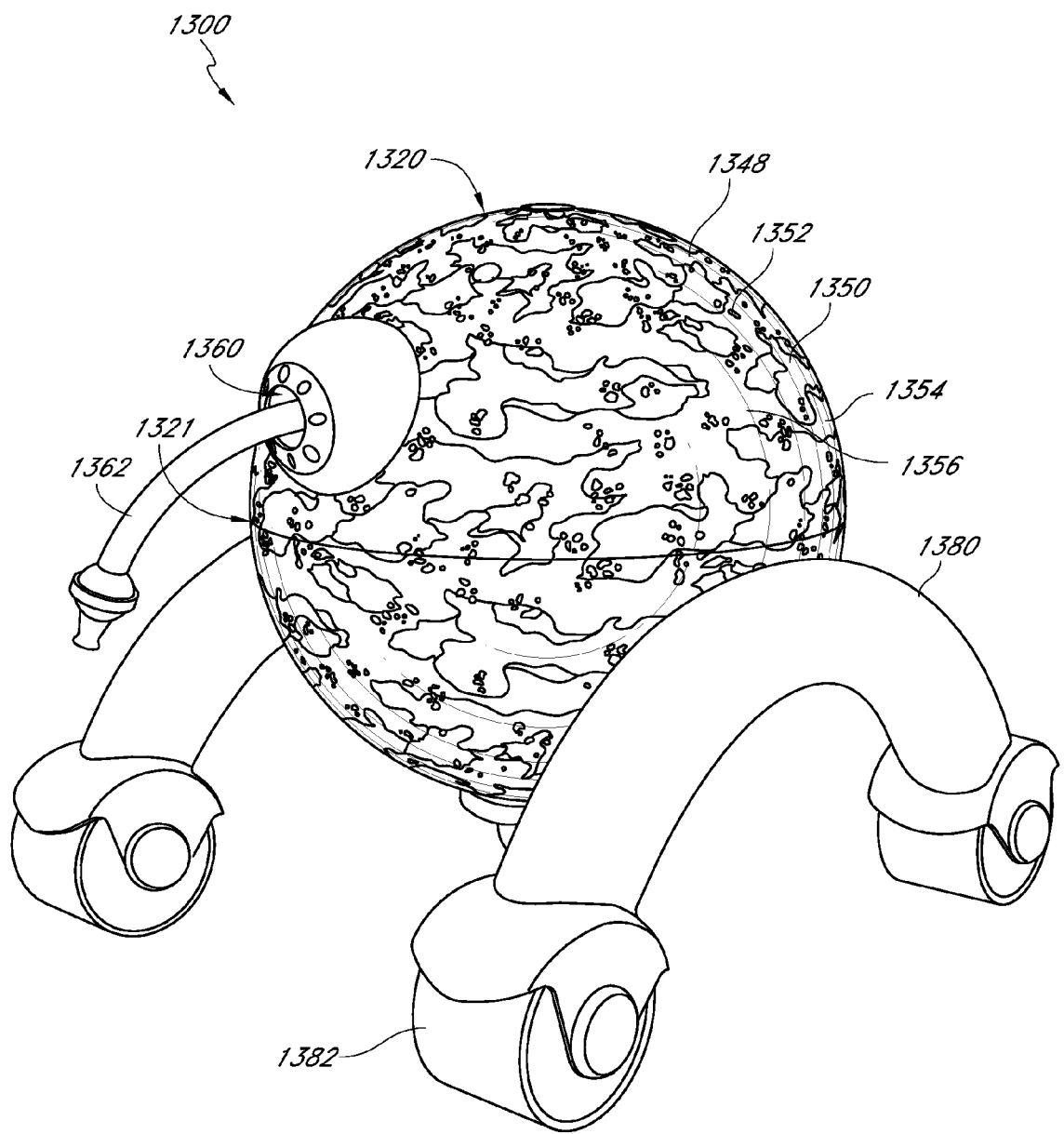
Figure 13C:
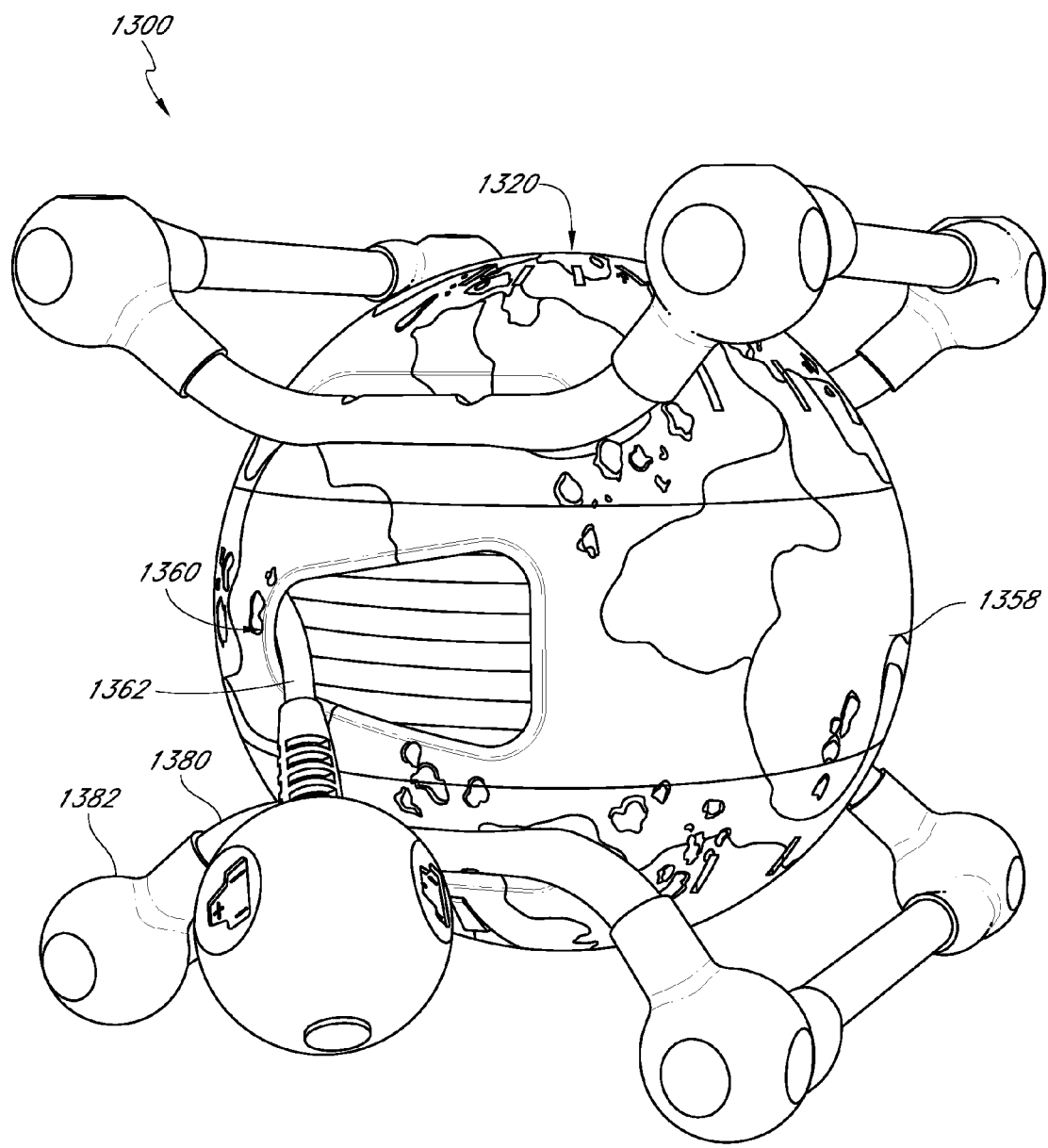
Figure 13D:
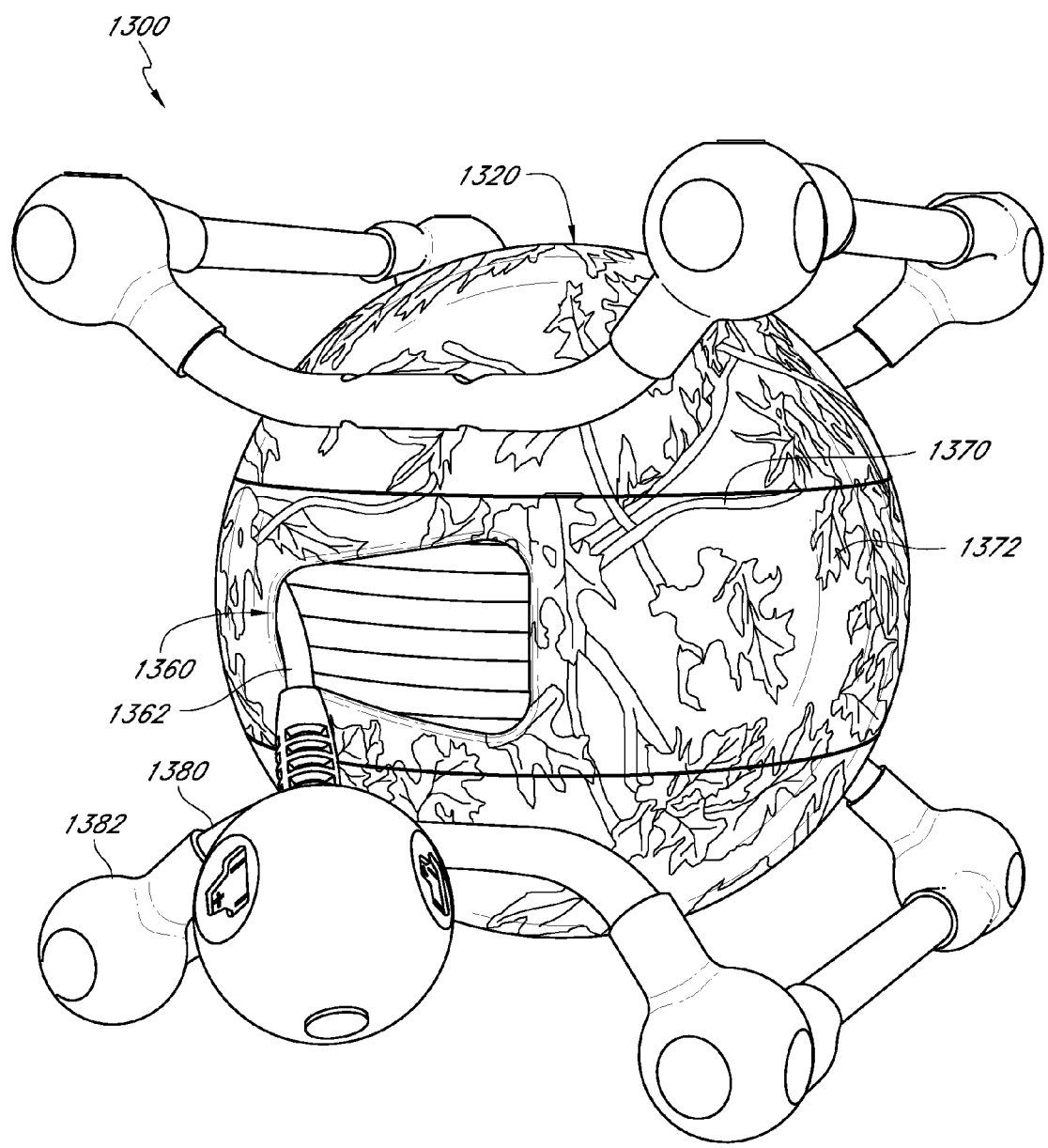

In the embodiments depicted in FIGS. 13A and 13B, the patches are irregularly and smoothly shaped. The patches may also comprise a micropattern including a plurality of small rectangular pixels of color 1358 (e.g., United States Marine Corps MARPAT, United States Army ACUPAT), as depicted in FIG. 13C. The patches may also comprise a combination of camouflage and foliage. For example, in the embodiment depicted in FIG. 13D, the decoration comprises patches including striated twigs 1370 and leaves 1372.

Figure 13E:
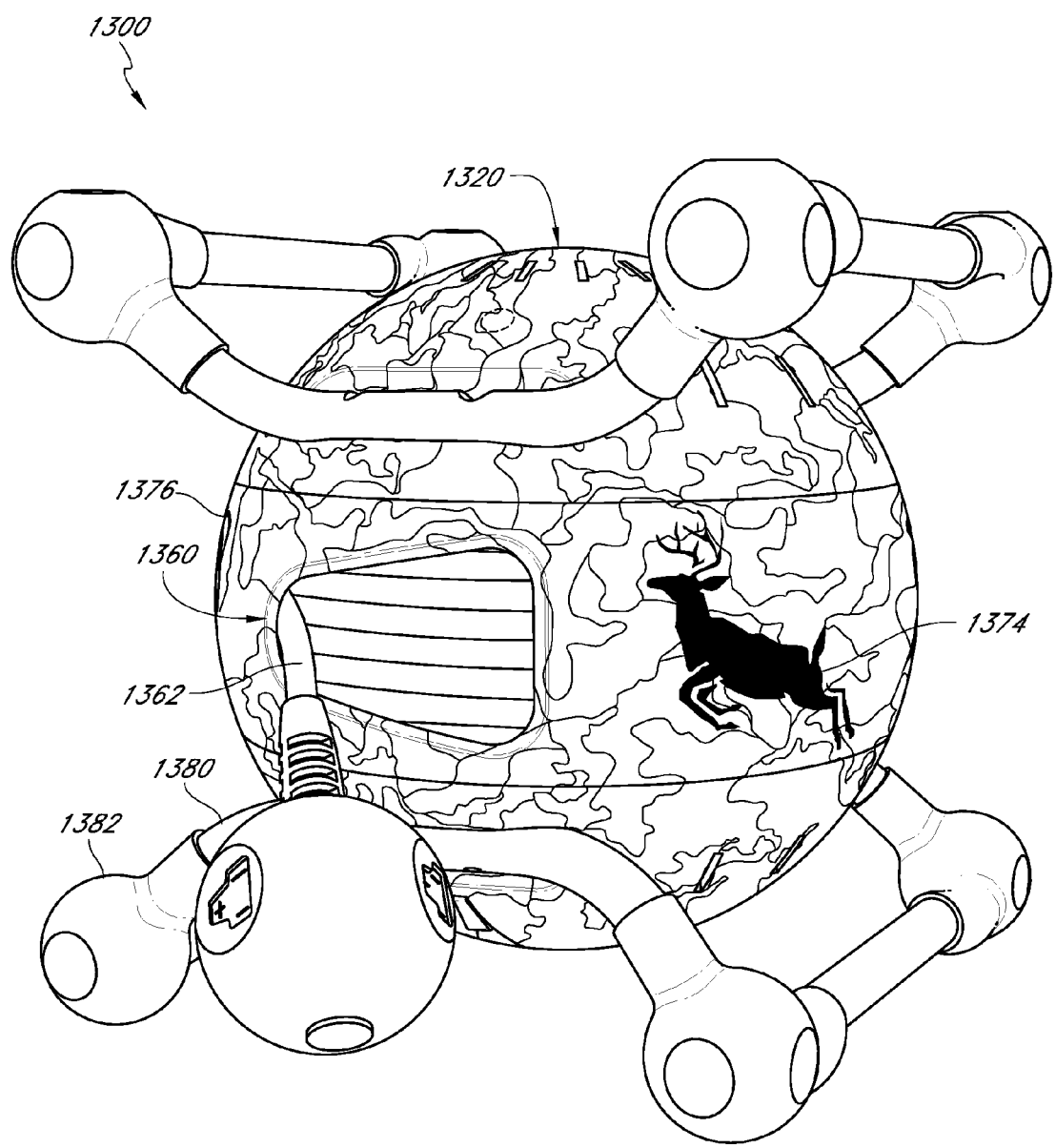
Figure 13F:
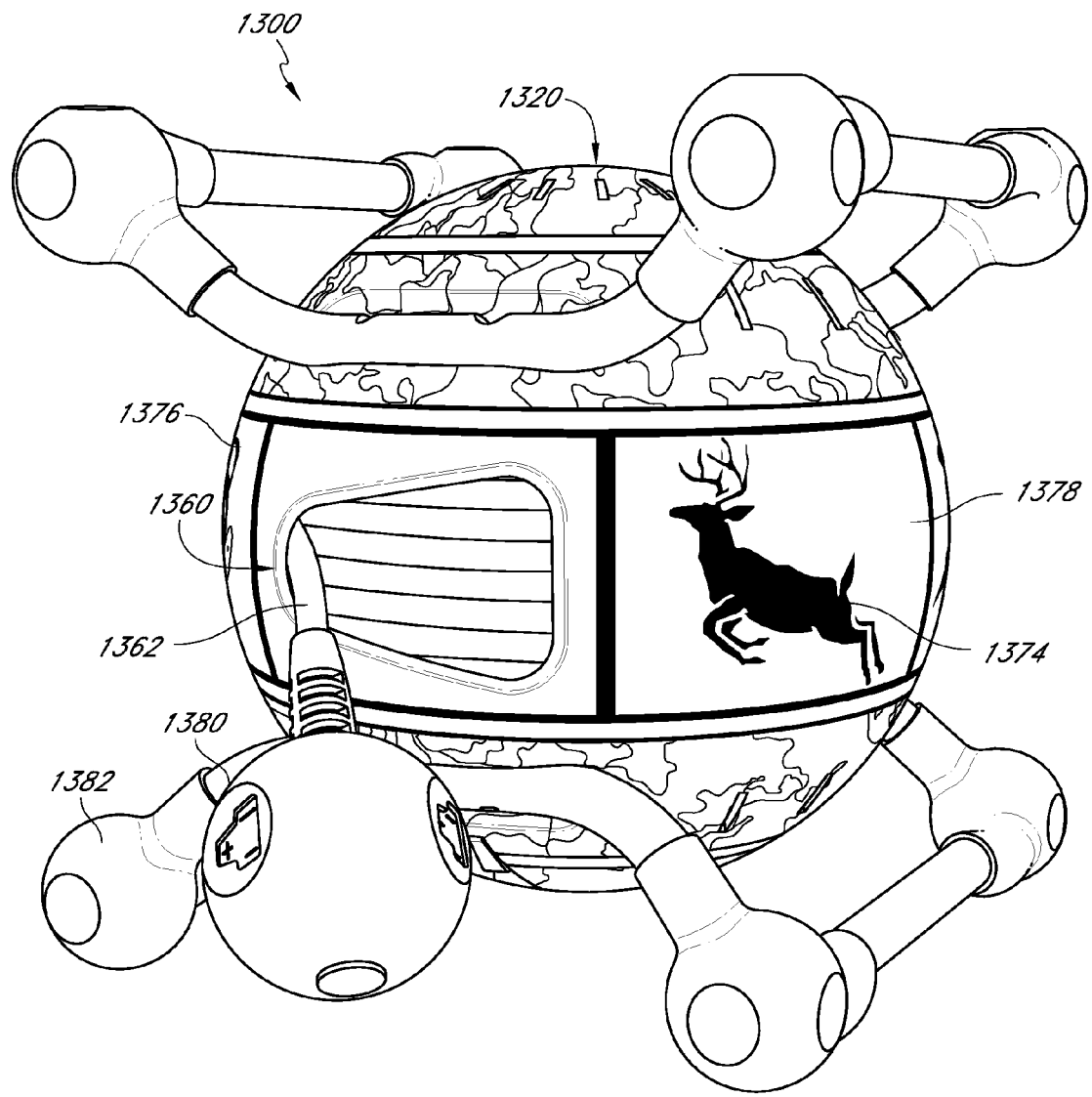

In certain embodiments, the housing 1320 comprises camouflage markings and other decoration. For example, FIG. 13E illustrates an embodiment in which the housing 1320 comprises hunting material depictions 1374, 1376. The hunting material depictions may comprise hunting indicia including traditionally hunted animals such as deer, elk, fish, and ducks and/or traditional hunting equipment such as skeet, rifles, and bullets. FIG. 13F illustrates an embodiment in which the hunting material depictions are offset against a background 1378. Although illustrated as being around a central portion of the housing 1320, the hunting material depictions 1374, 1376 and/or the background 1378 may be anywhere on the housing 1320.

In certain embodiments, the housing 1320 comprises upper and lower hemispheres joined together at an interface 1321 (FIGS. 13A and 13B). Preferably, the upper and lower hemispheres can rotate with respect to one another about a substantially vertical axis.

An apparatus 1300 including the housing 1320 may include a support structure 1380 (e.g., comprising one or more legs) to support the housing 1320. The support structure 1380 may be mechanically coupled to a plurality of base members 1382. In certain embodiments, the base members 1382 include feet (e.g., as depicted in FIGS. 13C-13F), wheels (e.g., as depicted in FIGS. 13A and 13B), casters, etc. In some embodiments, the support structure 1380 and/or base members 1382 may complement the decoration. For example, the support structure 1380 may depict hunting equipment (e.g., rifles), the base members 1382 may depict hunting equipment (e.g., skeet), and the support structure 1380 and/or the base members 1382 may be camouflaged. However, the support structure 1380 and the base members 1382 are not essential features of a decorative housing 1320, nor are the position of the aperture 1360 or the type of elongate member 1362.

Figure 14A:
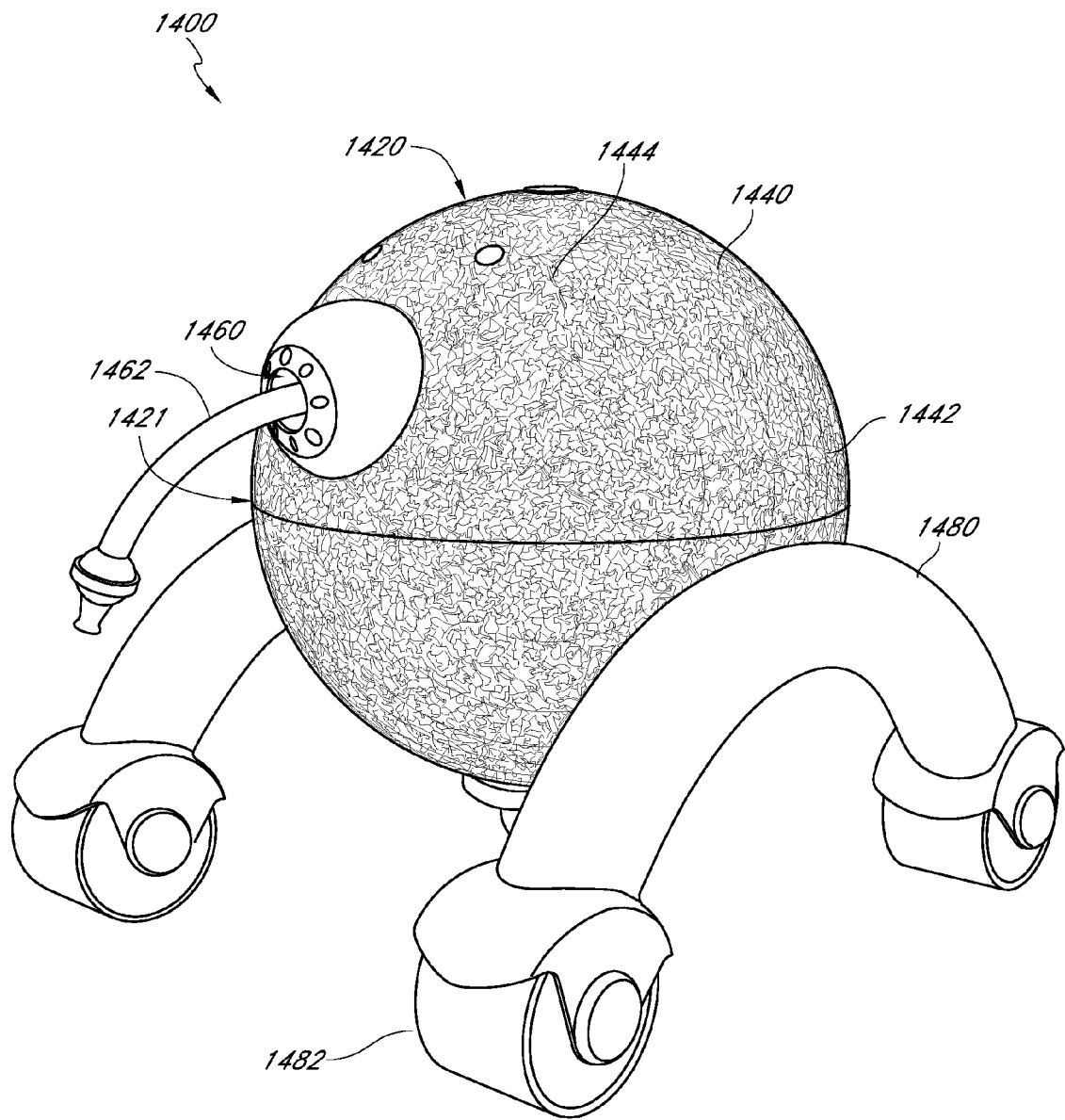
FIGS. 14A and 14B are right, front, and top perspective views of example embodiments of reel housings configured to have the appearance of foliage.
Figure 14B:
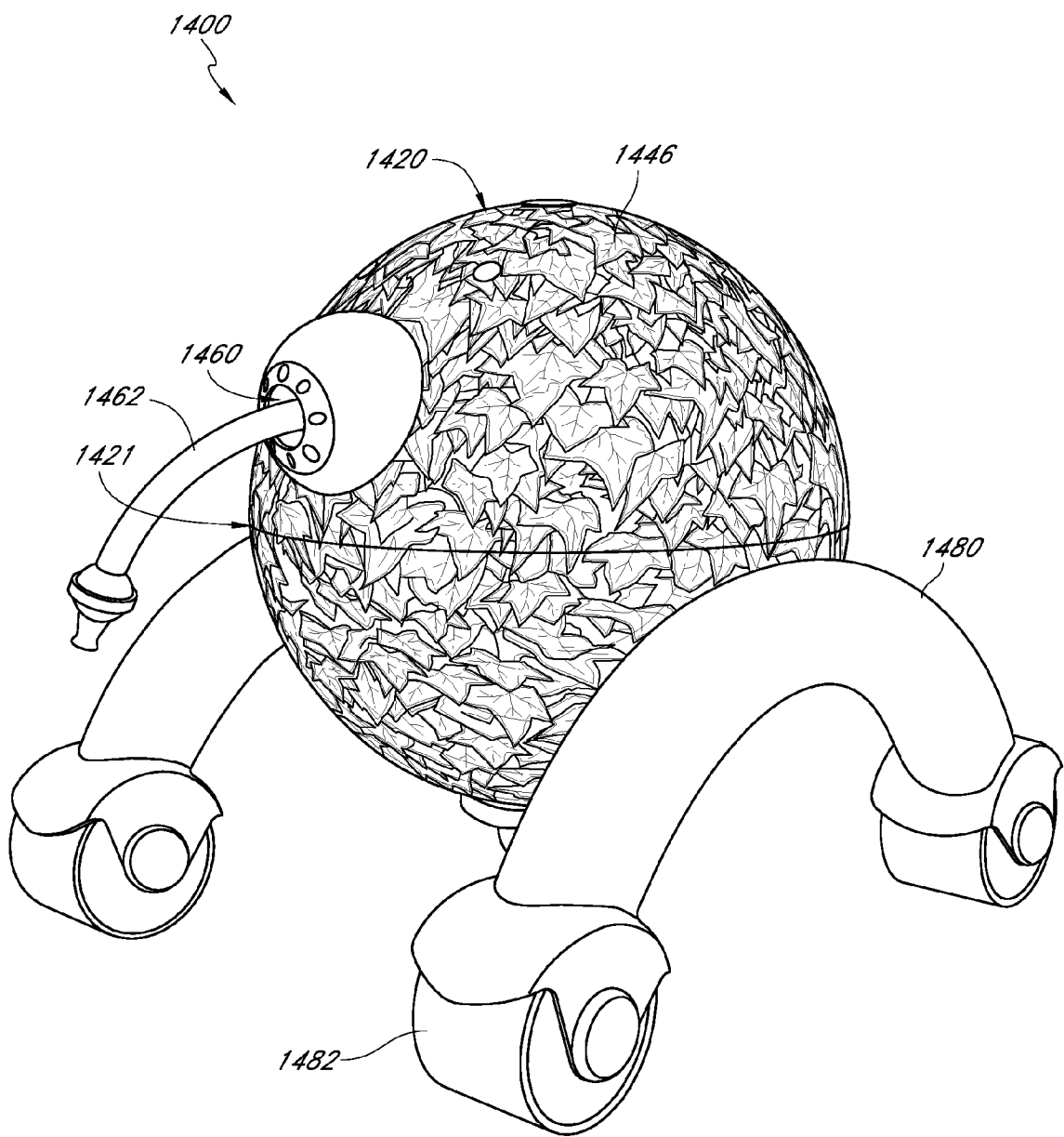

FIGS. 14A and 14B illustrate housings 1420 comprising decoration indicative of foliage. The housing 1420 includes an opening or aperture 1460 through which an elongate member 1462 (e.g., comprising a hose, comprising an electrical cable) can extend. Although illustrated in an upper hemisphere of the housing 1420, the aperture 1460 may be located in any suitable position on the housing 1420, for example a central portion or in a lower hemisphere.

In a housing 1420 indicative of foliage, the foliage may comprise the natural surroundings of the housing 1420. In certain embodiments, the depicted foliage comprises a plurality of leaves 1440, flowers 1442, and twigs 1444. In certain embodiments, the housing 1420, including the markings 1440, 1442, 1444, is substantially smooth. In certain such embodiments, the markings 1440, 1442, 1444 are shaded to simulate the appearance of topography (e.g., having leave shadows). In some embodiments, the foliage 1440, 1442, 1444 are topographically raised with respect to each other to simulate layering. In certain embodiments, the housing 1420 is adapted to have a surface texture consistent with foliage. Decoration depicting other foliage is also possible, for example and without limitation, a plurality of large leaves 1446 (e.g., as depicted in FIG. 14B).

In certain embodiments, the housing 1420 comprises upper and lower hemispheres joined together at an interface 1421. Preferably, the upper and lower hemispheres can rotate with respect to one another about a substantially vertical axis.

An apparatus 1400 including the housing 1420 may include a support structure 1480 (e.g., comprising one or more legs) to support the housing 1420. The support structure 1480 may be mechanically coupled to a plurality of base members 1482. In certain embodiments, the base members 1482 include feet, wheels (e.g., as depicted in FIG. 14), casters, etc. In some embodiments, the support structure 1480 and/or base members 1482 may complement the decoration. However, the support structure 1480 and the base members 1482 are not essential features of a decorative housing 1420, nor are the position of the aperture 1460 or the type of elongate member 1462.

Figure 15:
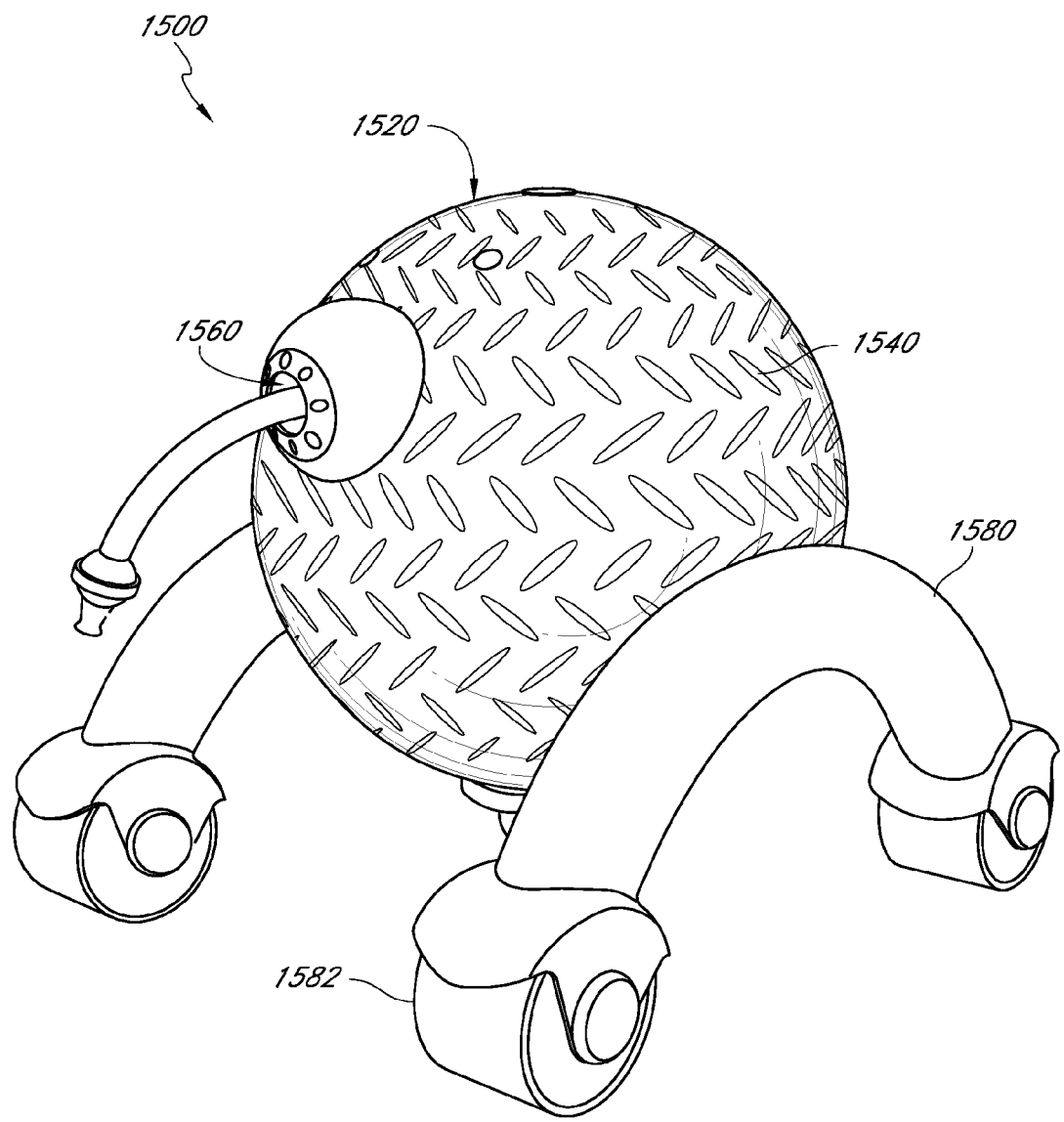
FIG. 15 is a right, front, and top perspective view of an example embodiment of a reel housing configured to have the appearance of diamond plate.

FIG. 15 illustrates a housing 1520 comprising decoration depicting diamond plate having markings 1540. The housing 1520 includes an opening or aperture 1560 through which an elongate member 1562 (e.g., comprising a hose, comprising an electrical cable) can extend. Although illustrated in an upper hemisphere of the housing 1520, the aperture 1560 may be located in any suitable position on the housing 1520, for example in an upper hemisphere or in a lower hemisphere.

In a housing 1520 indicative of diamond plate, the markings may comprise a plurality of angled ribs 1540. The markings 1540 may cover the entire housing 1520, a portion of the housing 1520, or a substantial portion of the housing 1520. In certain embodiments, the housing 1520, including the markings 1540, is substantially smooth. In certain such embodiments, the markings 1540 are shaded to simulate the appearance of topography. In some embodiments, the markings 1540 are topographically raised with respect to the rest of the housing 1520. In certain embodiments, the housing 1520 is adapted to have a surface texture consistent with diamond plate (e.g., including a metallic material to simulate the feel and/or appearance of diamond plate). The housing 1520 preferably comprises a traditional gray color, although other colors and schemes are also possible.

In certain embodiments, the housing 1520 comprises upper and lower hemispheres joined together at an interface 1521. Preferably, the upper and lower hemispheres can rotate with respect to one another about a substantially vertical axis.

An apparatus 1500 including the housing 1520 may include a support structure 1580 (e.g., comprising one or more legs) to support the housing 1520. The support structure 1580 may be mechanically coupled to a plurality of base members 1582. In certain embodiments, the base members 1582 include feet, wheels (e.g., as depicted in FIG. 15), casters, etc. In some embodiments, the support structure 1580 and/or base members 1582 may complement the decoration. For example, the base members 1582 may also have decoration indicative of diamond plate. However, the support structure 1580 and the base members 1582 are not essential features of a decorative housing 1520, nor are the position of the aperture 1560 or the type of elongate member 1562.

Figure 16A:
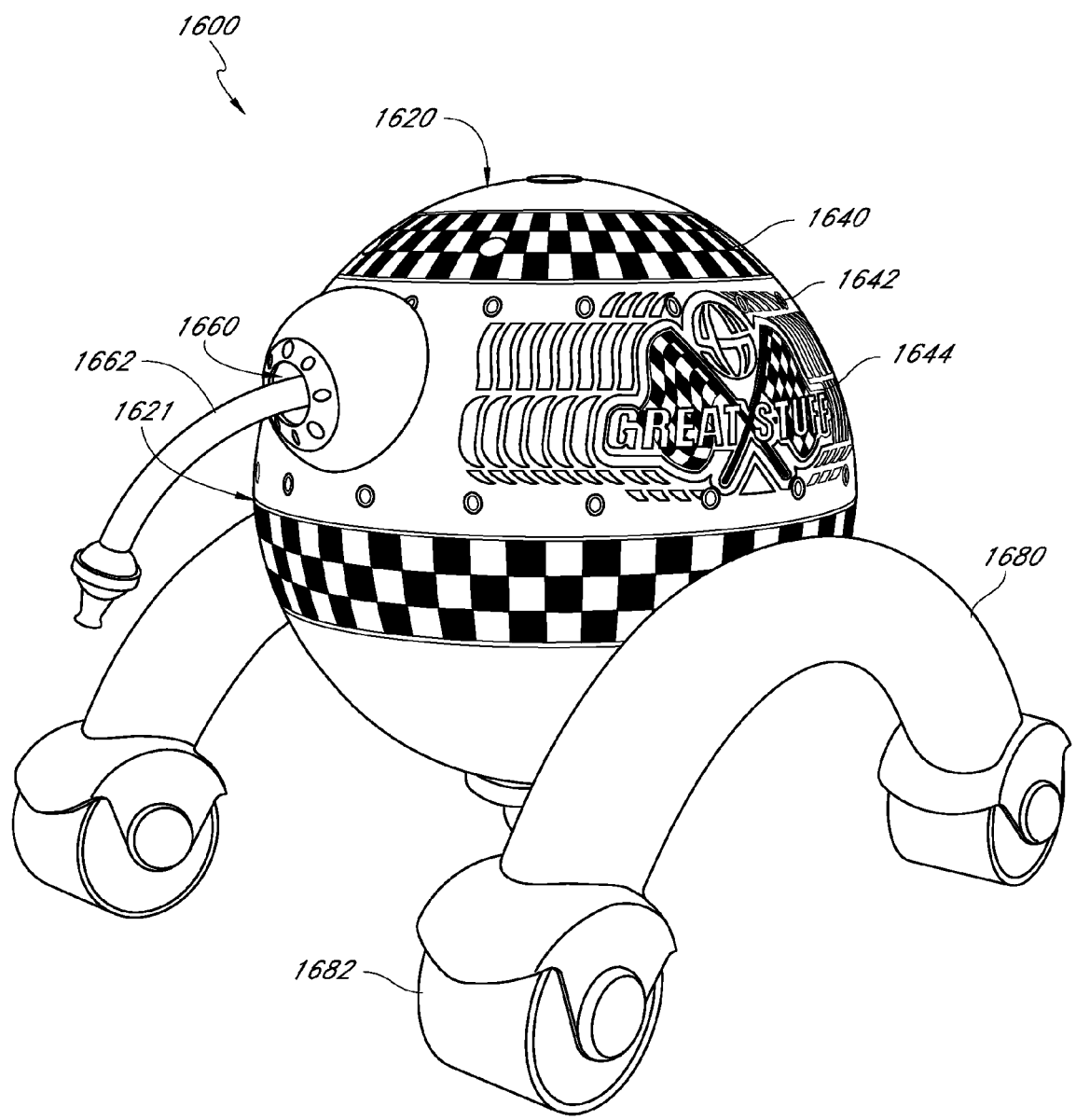
FIGS. 16A and 16B is a right, front, and top perspective view of an example embodiment of a reel housing configured to have the appearance of a car racing indicia.
Figure 16B:
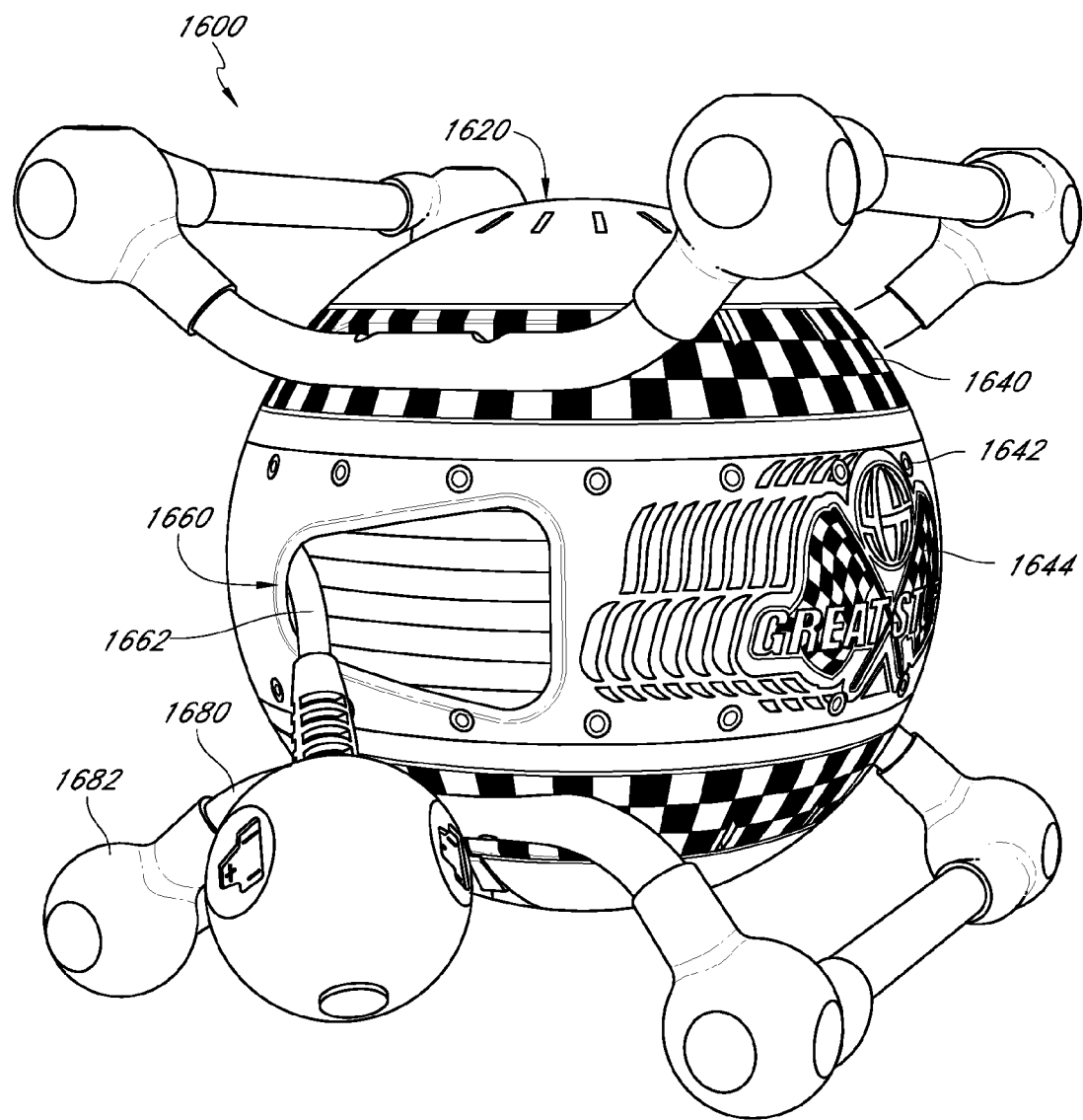

FIG. 16 illustrates a housing 1620 comprising decoration depicting a ball having markings 1640, 1642, 1644 indicative of a race car. The housing 1620 includes an opening or aperture 1660 through which an elongate member 1662 (e.g., comprising a hose, comprising an electrical cable) can extend. Although illustrated in an upper hemisphere of the housing 1620, the aperture 1660 may be located in any suitable position on the housing 1620, for example a central portion or in a lower hemisphere.

In a housing 1620 indicative of a race car, the markings may comprise one or more bands of checkered material 1640, a plurality of rivets 1642, and text, logos, or the like 1644 to depict a certain type of race car (e.g., from a certain sponsor, for a certain driver) or reel manufacturer (e.g., Great Stuff, Inc.™). The markings may further comprise a number (not shown), for example on a side opposite the logo 1644. The markings 1640, 1642, 1644 may cover the entire housing 1620, a portion of the housing 1620, or a substantial portion of the housing 1620. In certain embodiments, the housing 1620, including the markings 1640, 1642, 1644 is substantially smooth. In certain such embodiments, the markings 1640, 1642, 1644 are shaded to simulate the appearance of topography. In some embodiments, the rivets 1642 are topographically raised with respect to the rest of the housing 1620. In certain embodiments, the housing 1620 is adapted to have a surface texture consistent with a race car (e.g., comprising a material similar to painted metal). The housing 1620 may comprise any combination of colors (e.g., orange, green), but preferably comprises a color scheme indicative of a sponsor, driver, reel manufacturer, or the like.

In certain embodiments, the housing 1620 comprises upper and lower hemispheres joined together at an interface 1621. Preferably, the upper and lower hemispheres can rotate with respect to one another about a substantially vertical axis.

An apparatus 1600 including the housing 1620 may include a support structure 1680 (e.g., comprising one or more legs) to support the housing 1620. The support structure 1680 may be mechanically coupled to a plurality of base members 1682. In certain embodiments, the base members 1682 include feet, wheels (e.g., as depicted in FIG. 16), casters, etc. In some embodiments, the support structure 1680 and/or base members 1682 may complement the decoration. For example, the support structure 1680 may depict shocks, the base members 1682 may depict racing tires, etc. However, the support structure 1680 and the base members 1682 are not essential features of a decorative housing 1620, nor are the position of the aperture 1660 or the type of elongate member 1662.

In certain embodiments, the decoration is applied using an in-mold decoration process. In some embodiments, the decoration is formed before the reel housing is formed. In certain embodiments, a thin film (e.g., between about 0.010 and 0.012 inches) includes a first side and a second side. The first side faces away from the housing and the second side faces the housing. The second side is decorated (e.g., with any of the decoration described above). Decorating the second side of the film may include, but is not intended to be limited to, painting, deposition of a uniform material, application of texture (including tactile texture and texture that is visible but smoothed by the film), and the like. In certain embodiments, the decoration extends throughout the thickness of the film. The film is applied to an inner surface of a mold (e.g., via static electricity) with the second side facing inward, either before or after decoration. The housing is then formed in the mold using, for example, injection molding or blow molding.

In injection molding, the mold comprises a "core" and a "cavity." When coupled, the core and the cavity create a hollow space that is the inverse of the housing (e.g., a hemisphere of the housing). Molten material (e.g., plastic) is injected into the mold under pressure, substantially filling the hollow space. After cooling, the material is removed from the mold. The thin film and the decoration described above are generally capable of withstanding the heat of the molten material.

In blow molding, the mold comprises a "preform" matching the outer shape of the housing. Molten material (e.g., plastic) is injected into the preform, and gas is applied to produce a bubble that stretches the injected material to the preform. After cooling, the material is removed from the mold. The thin film and the decoration described above are generally capable of withstanding the heat of the molten material.

In certain embodiments, the upper and lower hemispheres of the housing are formed separately. For example, one hemisphere may be injection molded and another hemisphere may be blow molded. In certain embodiments, lunes or other portions of the housing are formed separately.

Once removed from the mold, the first side of the film is exposed to the environment, but the second side of the film is between the first side and the molded housing. The film may be clear or thin, allowing the decoration to show through to the first side. In embodiments, the decoration extends throughout the film, allowing the decoration to show through to the first side. As such, the decoration is resistant to wear, chipping, scratching, etc. In certain embodiments, the film becomes part of (e.g., integrated with) the housing. Other methods of applying the decoration to the housing are also possible (e.g., comprising painting the first side of the film, sandwiching the decoration between two films, etc.).

In some embodiments, the decoration is formed after the reel housing is formed. In certain embodiments, the exterior of the housing is painted to form the decoration. In certain embodiments, a thin film (e.g., between about 0.010 and 0.012 inches) comprising the decoration is adhesively bound to the housing. The decoration may be on a side of the thin film that is adhesively bound to the housing and/or on a side of the film that faces away from the housing. In certain such embodiments, a vinyl sheet (e.g., Controltac™, available from 3M of Maplewood, Minn.) comprising the decoration is used to "wrap" the housing. Wrapped sheets are generally easier to remove, allowing for easier change from one decoration to another. For example, an owner of a housing may change the decoration from basketball in the winter to baseball in the summer by removing the wrap and rewrapping with a prefabricated vinyl sheet. Other methods are also possible (e.g., decals applied with an applicator).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A reel comprising:
   a substantially spherical housing supported by, and mechanically coupled to, a support structure and configured to enclose a rotatable element about which linear materials can be spooled;
   an aperture within the housing, the aperture sized to closely surround a linear material extending through the aperture, the linear material spoolable and unspoolable from the rotatable element while the housing encloses the rotatable element, wherein said housing comprises decoration depicting a ball indicative of a game or type of recreation;

wherein the support structure is configured to support the reel housing on a support surface during rotation of the element to unspool the linear material;

wherein the support structure is mechanically coupled to a plurality of base members; and wherein the base members comprise one or more of feet, wheels, and casters.

2. The reel of claim 1, wherein the decoration depicts a basketball.

3. The reel of claim 1, wherein the decoration depicts a baseball.

4. The reel of claim 1, wherein the decoration depicts a golf ball.

5. The reel of claim 1, wherein the decoration depicts a soccer ball.

6. The reel of claim 1, wherein the decoration depicts a tennis ball.

7. The reel of claim 1, wherein the decoration depicts a volleyball.

8. The reel of claim 1, wherein the decoration depicts a beach ball.

9. The reel of claim 1, wherein the support structure comprises at least one leg.

10. A reel comprising:
a substantially spherical housing supported by, and mechanically coupled to, a support structure and configured to enclose a rotatable element about which linear materials can be spooled;

an aperture within the housing, the aperture sized to closely surround a linear material extending through the aperture, the linear material spoolable and unspoolable from the rotatable element while the housing encloses the rotatable element, wherein said housing comprises decoration depicting a globe;

wherein the support structure is configured to support the reel housing on a support surface during rotation of the element to unspool the linear material;

wherein the support structure is mechanically coupled to a plurality of base members; and wherein the base members comprise one or more of feet, wheels, and casters.

11. The reel of claim 10, wherein the globe depicts Earth.

12. The reel of claim 10, wherein the support structure comprises at least one leg.

13. A reel comprising:
a substantially spherical housing supported by, and mechanically coupled to, a support structure and configured to enclose a rotatable element about which linear materials can be spooled;

an aperture within the housing, the aperture sized to closely surround a linear material extending through the aperture, the linear material spoolable and unspoolable from the rotatable element while the housing encloses the rotatable element, wherein said housing comprises decoration depicting camouflage;

wherein the support structure is configured to support the reel housing on a support surface during rotation of the element to unspool the linear material;

wherein the support structure is mechanically coupled to a plurality of base members; and wherein the base members comprise one or more of feet, wheels, and casters.

14. The reel of claim 13, wherein the camouflage comprises woodland camouflage.

15. The reel of claim 13, wherein the camouflage comprises desert camouflage.

16. The reel of claim 13, wherein the camouflage comprises a micropattern.

17. The reel of claim 13, wherein the camouflage further comprises hunting indicia.

18. The reel of claim 13, wherein the support structure comprises at least one leg.

19. A reel comprising:
a substantially spherical housing supported by, and mechanically coupled to, a support structure and configured to enclose a rotatable element about which linear materials can be spooled;

an aperture within the housing, the aperture sized to closely surround a linear material extending through the aperture, the linear material spoolable and unspoolable from the rotatable element while the housing encloses the rotatable element, wherein said housing comprises decoration depicting foliage;

wherein the support structure is configured to support the reel housing on a support surface during rotation of the element to unspool the linear material;

wherein the support structure is mechanically coupled to a plurality of base members; and wherein the base members comprise one or more of feet, wheels, and casters.

20. The reel of claim 19, wherein the foliage comprises a plurality of leaves.

21. The reel of claim 19, wherein the support structure comprises at least one leg.

* * * * *